(12) United States Patent
Kimura et al.

(10) Patent No.: US 7,976,657 B2
(45) Date of Patent: Jul. 12, 2011

(54) METHOD AND SYSTEM FOR CONTINUOUSLY MANUFACTURING LIQUID-CRYSTAL DISPLAY ELEMENT

(75) Inventors: Kouji Kimura, Osaka (JP); Kazuo Kitada, Osaka (JP); Fumihito Shimanoe, Osaka (JP); Tomokazu Yura, Osaka (JP); Satoru Koshio, Osaka (JP); Takuya Nakazono, Osaka (JP); Teruaki Osawa, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/903,906

(22) Filed: Oct. 13, 2010

(65) Prior Publication Data

US 2011/0083790 A1    Apr. 14, 2011

(30) Foreign Application Priority Data

Oct. 13, 2009   (JP) .................................. 2009-236088

(51) Int. Cl.
*B32B 41/00* (2006.01)
(52) U.S. Cl. ........... 156/64; 156/353; 156/360; 156/361
(58) Field of Classification Search .................... 156/64, 156/252, 253, 269, 270, 353, 360, 361, 378, 156/379
See application file for complete search history.

(56) References Cited

U.S. PATENT DOCUMENTS

| | | | |
|---|---|---|---|
| 2004/0095526 A1 | 5/2004 | Yamabuchi et al. | |
| 2004/0169809 A1 | 9/2004 | Yamabuchi et al. | |
| 2005/0199337 A1 | 9/2005 | Nishikubo et al. | |
| 2007/0013858 A1 | 1/2007 | Yamabuchi et al. | |
| 2009/0159175 A1 | 6/2009 | Nakahira et al. | |
| 2009/0199950 A1* | 8/2009 | Kitada et al. ..................... | 156/64 |
| 2010/0165333 A1 | 7/2010 | Ohashi et al. | |

FOREIGN PATENT DOCUMENTS

| | | |
|---|---|---|
| DE | 102007043408 | 3/2009 |
| JP | 57-052017 | 3/1982 |
| JP | 11-095028 | 4/1999 |
| JP | 2002-023151 | 1/2002 |
| JP | 2003-161935 | 6/2003 |
| JP | 2003-202298 | 7/2003 |
| JP | 2003-344302 | * 12/2003 |

(Continued)

OTHER PUBLICATIONS

Taiwanese Office Actin for 099129090, citing the above reference(s).*

(Continued)

*Primary Examiner* — George R Koch, III
(74) *Attorney, Agent, or Firm* — Lowe Hauptman Ham & Berner LLP

(57) ABSTRACT

A method for continuously manufacturing liquid-crystal display elements includes steps of; continuously feeding an optical film laminate, calculating a length measurement data based on the feed length of the optical film laminate, detecting a mark provided to the optical film laminate indicating defect information in a polarizing composite film being detected in a preliminary inspection, sequentially forming slit lines in a transverse direction with respect to the feed direction of the optical film laminate, determining the polarizing composite film sheet separated by the respective slit lines is a defective polarizing sheet or a normal polarizing sheet, peeling a sheet determined to be a normal polarizing sheet from the carrier film, and laminating the normal polarizing sheet to a respective one of liquid-crystal panel.

13 Claims, 20 Drawing Sheets

FOREIGN PATENT DOCUMENTS

| | | | |
|---|---|---|---|
| JP | 2004-144913 | | 5/2004 |
| JP | 2004-361741 | | 12/2004 |
| JP | 2005-062165 | | 3/2005 |
| JP | 2005-114624 | * | 4/2005 |
| JP | 2005-298208 | | 10/2005 |
| JP | 2006-058411 | | 3/2006 |
| JP | 2007-064989 | | 3/2007 |
| JP | 2007-114449 | * | 5/2007 |
| JP | 2007-140046 | | 6/2007 |
| JP | 2008-176280 | * | 7/2008 |
| JP | 2009-061498 | | 3/2009 |
| JP | 2009-175653 | * | 8/2009 |
| KR | 20030042760 | | 6/2003 |
| WO | 2009/025210 | | 2/2009 |

OTHER PUBLICATIONS

Signed and intialed copy of Jan. 5, 2011 IDS.*
Korean Notice of Allowance for 10-2010-0052164, citing the above reference(s).
European Search Report for 10186374, citing the above reference(s).

* cited by examiner

FIG.7

| inspection unit | type of defect ||||||
| --- | --- | --- | --- | --- | --- |
| | internal foreign substances | internal pores | bright spots | surface irregularities | flaw/undulation |
| reflection | △ | △ | × | ○ | ○ |
| transmission | ○ | ○ | △ | △ | × |
| detect defects by cross-Nichol condition | ○ | ○ | ○ | × | ○ |

FIG.16
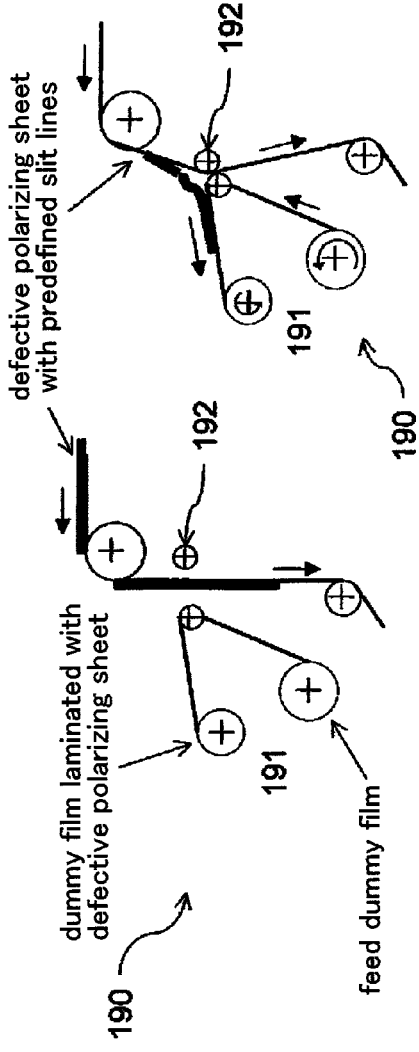
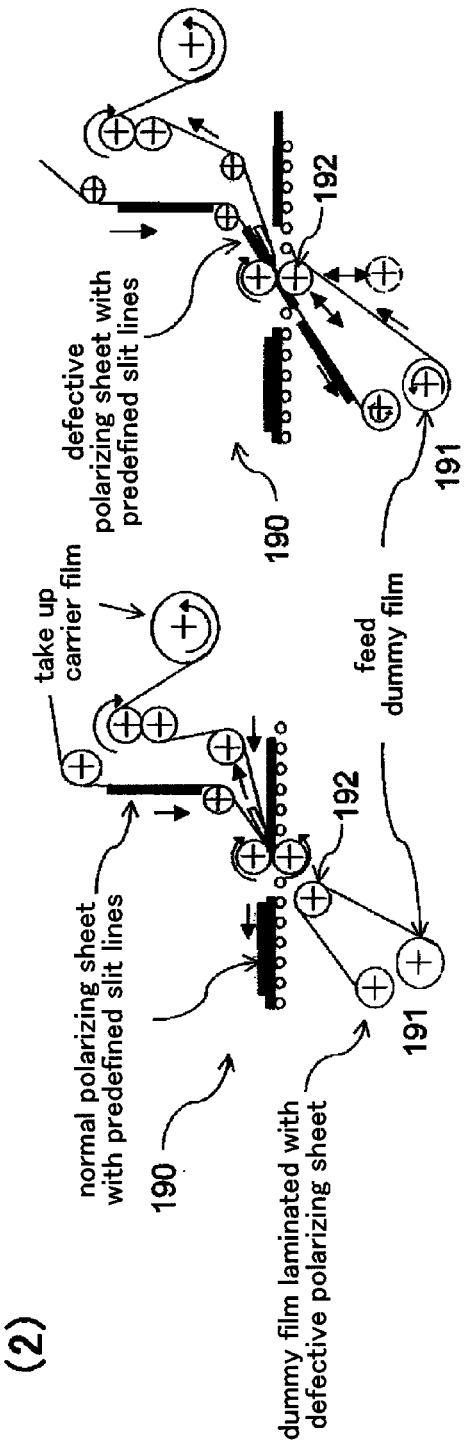

FIG.20

| | feature of mark | | | | | | condition for marking | | results | |
|---|---|---|---|---|---|---|---|---|---|---|
| | shape of mark | | | optical density | thickness (μm) | optical density per unit thickness | marking speed (m/min) | type of marker | detection ratio (%) n=100 | number of unacceptable markings (/1000) |
| | height (mm) | width (mm) | aspect ratio | | | | | | | |
| example 1 | 10.1 | 5.1 | 2.0:1 | 2.2 | 0.7 | 3.2 | 10.0 | A | 100 | 2 |
| example 2 | 6.2 | 3.2 | 1.9:1 | 2.1 | 0.6 | 3.5 | 10.0 | A | 100 | 0 |
| example 3 | 7.5 | 5.1 | 1.5:1 | 2.5 | 0.8 | 3.1 | 10.0 | A | 100 | 4 |
| example 4 | 4.9 | 3.2 | 1.5:1 | 2.4 | 0.7 | 3.4 | 10.0 | A | 100 | 1 |
| comparative example 1 | 4.9 | 5.1 | 1.0:1 | 2.2 | 0.7 | 3.2 | 10.0 | A | 96 | 1 |
| comparative example 2 | 3.1 | 3.2 | 1.0:1 | 2.4 | 0.7 | 3.4 | 10.0 | A | 94 | 2 |
| comparative example 3 | 10.1 | 5.1 | 2.0:1 | 1.2 | 0.4 | 3.0 | 20.0 | A | 82 | 0 |
| comparative example 4 | 6.2 | 3.2 | 1.9:1 | 1.3 | 0.4 | 3.3 | 20.0 | A | 69 | 0 |
| comparative example 5 | 9.9 | 5.5 | 1.8:1 | 3.2 | 2.9 | 1.1 | 10.0 | B | 100 | 87 |
| comparative example 6 | 6.2 | 3.5 | 1.8:1 | 2.9 | 2.6 | 1.1 | 10.0 | B | 100 | 54 |
| comparative example 7 | 9.9 | 5.5 | 1.8:1 | 1.7 | 1.4 | 1.2 | 20.0 | B | 91 | 13 |
| comparative example 8 | 6.2 | 3.5 | 1.8:1 | 1.5 | 1.3 | 1.2 | 20.0 | B | 83 | 15 |
| comparative example 9 | 10.0 | 4.8 | 2.1:1 | 1.4 | 0.9 | 1.6 | 10.0 | C | 85 | 3 |
| comparative example 10 | 5.9 | 2.7 | 2.2:1 | 1.6 | 1 | 1.6 | 10.0 | C | 79 | 5 |

METHOD AND SYSTEM FOR CONTINUOUSLY MANUFACTURING LIQUID-CRYSTAL DISPLAY ELEMENT

CROSS-REFERENCE TO RELATED APPLICATIONS

The present application claims priority to Japanese patent application number 2009-236088, filed on Oct. 13, 2009, which is incorporated by reference in its entirety.

TECHNICAL FIELD

The present invention relates to a method and system for continuously manufacturing liquid-crystal display elements. More particularly, the present invention relates to a method and system for continuously manufacturing liquid-crystal display elements, wherein defect-free sheets are formed from a continuous web of optical film laminate to which information of defect in the polarizing composite film is in advance provided in the form of a mark, and the sheets are laminated to liquid-crystal panels.

BACKGROUND ART

Taking a widescreen television having a diagonal screen size of 42 inches as an example, a liquid-crystal panel W therefor comprises a layered liquid-crystal panel which includes a pair of rectangular-shaped glass substrates each having a size of about 540 to 560 mm in length×about 950 to 970 mm in width×about 0.7 mm (700 μm) in thickness, and a liquid-crystal layer having a thickness of about 5 μm having a transparent electrode, a color filter etc., and sandwiched between the glass substrates, as shown in FIG. 2. The thickness of the liquid-crystal panel W itself is about 1.4 mm (1400 μm). The liquid-crystal display element is typically formed from a liquid crystal panel by adhesively applying a sheet of polarizing composite film 11' having a polarizer and a protective film to each of front (viewing side) and back side (backlight side) thereof. The sheet of polarizing composite film 11' is formed, as shown in FIG. 1 (before use), to have a dimension shown in FIG. 2 for example, from a polarizing composite film 11 included in a flexible optical film laminate 10 having a laminate structure.

For the liquid-crystal display element to function, the direction of orientation of liquid-crystal molecules and the direction of polarization of the polarizer are closely related each other. In liquid-crystal display element technologies, LCD using a TN (Twisted Nematic) type liquid-crystal has first been put into practical use, and then LCD using a VA (vertical Alignment) type liquid-crystal, an IPS (Inplane Switching) type liquid-crystal etc., have been put into practical use. Although a detailed technical explanation is omitted, in an LCD using such TN-type liquid-crystal panel, liquid-crystal molecules are provided between two upper and lower orientation films having respective rubbing directions on the inner surfaces of glass substrates of the liquid-crystal panel. This means that the liquid-crystal molecules are twisted by 90 degrees along the optical axis, so that when a voltage is applied, the liquid-crystal molecules are aligned in a direction perpendicular to the orientation films. However, in the case where the LCD is designed to allow images as seen from right and left sides of a display screen as those view directly in front of the display screen, the direction of rubbing on the orientation film at the viewing-side must be 45 degrees and the rubbing direction of the other orientation film must be 135 degrees. It is therefore necessary that polarizing sheets made from polarizing composite films to be laminated respectively on the front and back sides of the liquid-crystal panel must have polarizers respectively oriented in directions inclined by 45 degrees with respect to a lengthwise or transverse direction of the display screen so as to conform to the rubbing directions.

Therefore, it is required that the optical film laminate is punched or cut into a rectangular-shaped sheet having a long side or a short side determined in accordance with the size of the TN liquid-crystal panel, in such a manner that the long or short side inclined by 45 degrees with respect to the orientation direction of the polarizer. This procedure is described in Japanese Laid-Open Patent Publication JP 2003-161935A (Patent Document 1) or Japanese Patent 3616866 B (Patent Document 2), for example. The sheet of such rectangular shape has a width or a short side dimension which is smaller than the width of the optical film laminate. The rectangular-shaped sheets punched or cut from the optical film laminate may be collectively referred as "individualized sheets."

In producing a liquid-crystal display element using such individualized sheets, each of the individualized sheets is punched or cut in advance with a separator adhered to an adhesive layer. The shaped individualized sheets are stored in a magazine in a liquid-crystal display element production process. The individualized sheets stored in the magazine are taken out and conveyed one-by-one by means of a suction conveyance unit to the lamination position with the liquid-crystal panel W. The separator releasably laminated to a formed adhesive layer is peeled from respective ones of the individualized sheets before being laminated to the liquid-crystal panel W, and each of the individualized sheets is laminated to the liquid-crystal panel W via as such exposed adhesive layer. As the individualized sheets are flexible, they tend to be bowed or warped on their edges, and thus it is a serious technical impediment in lamination with liquid-crystal panels. Thus, in producing a liquid-crystal display element using individualized sheets, it has been required to adopt individualized sheets having four trimmed sides and a certain level of stiffness for less deflection or bend and which can be conveyed and laminated easily, to facilitate peeling respective ones of separators one-by-one and an accurate and swift positioning and laminating respective ones of the individualized sheets with liquid-crystal panels. For this reason, the individualized sheets have been laminated with a protective film, for example, of 40 to 80 μm thick not only to one surface but also to both surfaces of the polarizer to have stiffness induced by a thickness. During the initial period in the history of the liquid-crystal display element manufacturing technology, the optical film sheet or a polarizing sheet comprised in such optical film sheet was generally known as "polarizing plate" which is still used as a common name.

In the manufacturing process of TN-type liquid-crystal display elements, it is impossible to obtain finished liquid-crystal display elements simply by sequentially laminating the sheets formed in the sequential punching or cutting process to respective ones of a plurality of liquid-crystal panels in a subsequent process. This is because the sheet of the optical film laminate is cut from the web in such a manner that the sheet has a long or short side extending in a direction 45 degrees with respect to the orientation direction of the polarizer which is the longitudinal or stretching direction of the polarizer base film (i.e., with respect to the feed direction of the optical film laminate prior to the punching or cutting process), so that the sheet cannot be laminated to respective ones of the liquid-crystal panels with the orientation as it has been cut from the web. Therefore, to laminate the sheets of polarizing composite film or the polarizing sheets to the liquid-crystal panel, the optical film laminate is punched out into sheets with their sides oriented in the direction of 45 degrees with respect to the lengthwise direction of the optical film laminate, using, for example, a die wider than a long side of the liquid-crystal panel to be appropriately fed to the lamination station where the polarizing sheets are laminated with the liquid-crystal panels, as seen in the Patent Document 1 or 2. Alternatively, the optical film laminate in use need to be an elongated optical film laminate preliminary punched or cut from the continuous web of the optical film laminate having a substantially large width in a direction 45 degrees inclined with respect to the lengthwise direction, or a plurality of formed sheets connected into a continuous film configuration. At any rate, the above methods do not provide any noticeable improvement over the method of using individualized sheets.

The Patent Document 3 is a Japanese Patent Publication No. 62-14810B which discloses, prior to the VA-type liquid-crystal and the IPS-type liquid-crystal are brought into practical use, an apparatus to produce a liquid-crystal panel element. The apparatus is considered to be a type of labeler unit which produces an LCD using the TN-type liquid-crystal. There is taught to produce the optical film laminate in the form of an elongated sheet, and for the purpose, the optical film laminate having a substantially large width is provided and slit in a direction 45 degrees inclined with respect to the lengthwise direction of the optical film laminate. Alternatively, a film-like elongated optical film laminate sheet may be formed by longitudinally connecting a plurality of optical film laminate sheets. Therefore, the method taught by the Patent Document 3 cannot be applied directly to a manufacturing process adapted to perform steps of continuously providing a plurality of polarizing sheets from an optical film laminate and laminating the respective polarizing sheets to respective ones of the liquid-crystal panels comprising VA-type or IPS-type liquid-crystal to produce liquid-crystal display elements Automation of manufacturing process for liquid-crystal display elements using individualized sheets is disclosed, for example, in the Japanese Patent Publication No. 2002-23151A (Patent Document 4). Flexible individualized sheets tend to be bowed or warped due to curves or distortion of its edge, and thus it is a serious technical impediment to accuracy and speed in registration and lamination with liquid-crystal panels. Thus, it will be understood that the individualized sheet is required to have a certain level of thickness and stiffness to facilitate registration and lamination with liquid-crystal panels typically in transportation under suction. For example, the disclosures in the Japanese Laid-Open Patent Publication No. 2004-144913A (Patent Document 5), Japanese Laid-Open Patent Publication No. 2005-298208A (Patent Document 6) or Japanese Laid-Open Patent Publication No. 2006-58411A (Patent Document 7) disclose measures for addressing such technical problems.

In contrast to TN-type liquid-crystal panels, the VA-type and IPS-type liquid-crystal panels are not designed to arrange liquid-crystal molecules in twisted orientations. Thus, in the case of the liquid-crystal display element using these types of liquid-crystal panels, there is no need to have the polarization axis of the polarizing sheet oriented at 45 degrees in view of viewing angle characteristics inherent to the orientation of the liquid-crystal. Each of these liquid-crystal display elements using these liquid-crystal panels is formed by applying the polarizing sheets to the opposite sides of the liquid-crystal display panel oriented with their polarization axes crossed at 90 degrees crossing angle. In the case of the VA-type and IPS-type liquid-crystal panels, with respect to the technical view point of symmetry of the viewing angle characteristics and visibility, maximum contrast can be obtained along the direction of the polarizing axis of the polarizing sheet, so that it is preferable that the sheets have polarizing axes oriented in parallel with the lengthwise or transverse direction of the liquid-crystal panel. Thus, it will be understood that these sheets to be applied to the liquid-crystal panel has a feature that the continuous web the optical film laminate including a polarizing composite film which has been subjected to a lengthwise or transverse stretching can be continuously fed out from a roll and cut along transverse lines with respect to the lengthwise direction of the web of the optical film laminate to sequentially produce rectangular polarizing sheets including the polarizing sheets having the same width as the web of the optical film laminate width.

Because of the improved viewing angle characteristics, for liquid-crystal used in a display element for widescreen televisions, the VA-type liquid-crystal or the IPS-type liquid-crystal are more widely adopted than the TN type. In view of such trend in environments of technical developments, proposals to enhance the manufacturing efficiency using these types of liquid-crystal panels have been made such as the one described in Japanese Laid-Open Patent Publication No. 2004-361741A (Patent Document 8). This patent discloses steps of continuously feeding a continuous optical film laminate, cutting the continuous optical film laminate in conformity to the size of a liquid-crystal panel and sequentially laminating a plurality of rectangular shaped sheets including sheets of polarizing composite film which have been produced by the cutting step to respective ones of a plurality of the liquid-crystal panels.

However, the mainstream of manufacture of liquid-crystal display elements is still based on the manufacturing technology utilizing individualized sheets, due to the following technical problems. In manufacturing liquid-crystal display elements, a critical technical challenge is to detect any defect which may otherwise be retained in the display elements to be formed, and to prevent any defective product from being produced. Most of the product defects primarily arise from defects in the polarizing composite film contained in the optical film laminate. However, it is not practical to provide an optical film laminate after completely removing all defects contained in individual films which are to be laminated together to form the optical film laminate, because it is extremely difficult to produce a defect-free continuous optical film laminate under existing circumstances. To maintain quality of display elements, it is not permitted to use a polarizing composite film sheet having visible flaws or defects for a sheet for television display element even if such a flaw or defect is small. Given that the long side dimension of a polarizing sheet formed from the polarizing composite film is about 1 m, if a defective region cannot be preliminarily removed, 20 to 200 defective liquid-crystal display elements out of 1,000 products will be produced.

Thus, under the existing circumstances, it has only been possible to define defect-free regions and defective regions in the polarizing composite film as the same rectangular shape and size, and defect-free polarizing sheets (hereinafter referred as "normal polarizing sheets") are then punched out or cut from the polarizing composite film, appropriately avoiding defective regions. Alternatively, the sheets may be punched out or cut in rectangular shape without separating defect-free regions and defective regions, and the defective regions (hereinafter referred as "defective polarizing sheets") may only be separated and removed in the later process. Thus, it is difficult to improve the production efficiency of manufacturing the individualized sheets better than that at present because of the limitations of product accuracy and manufacturing speed.

Proposals relating to a preliminary inspection apparatus for a polarizing composite film have previously been made, as disclosed, for example, in Japanese Patent No. 3974400B (Patent Document 9), Japanese Laid-Open Patent Publications 2005-62165A (Patent Document 10) and 2007-64989A (Patent Document 11) for improving the production efficiency of manufacturing the individualized sheets as much as possible. These proposals primarily include the following two steps. The first step comprises inspecting defects in the polarizing composite film of the optical film laminate being continuously fed to determine positions or positions in coordinates of the detected defects through image processing, and encoding the information obtained by the image processing. The first step further comprises directly printing the encoded information on marginal or edge portion of the optical film laminate which will be left after cutting the optical film laminate during the production of the individualized sheets, and winding the resulting optical film laminate to form a roll. The second step comprises reading the encoded information printed on the optical film laminate fed from the roll, and providing marks to the positions of the defects based on the results of determination on the presence of defects, followed by subsequent steps of cutting the optical film laminate for producing individualized sheets, and based on the marks provided in advance, sorting the individualized sheets into normal polarizing sheets and defective polarizing sheets. The above steps have been believed as being essential to improving yield in the manufacture of such individualized sheets.

Further, Japanese Laid-Open Patent Publications 2007-140046A (Patent Document 12) discloses a method comprising the steps of exposing a polarizing composite film having an adhesive layer ("polarizing plate stock" in Patent Document 12) by peeling a carrier film ("a releasable film" in Patent Document 12) included in the optical film laminate continuously fed out from a roll of the optical film laminate, detecting existence of any defect or defects present in the polarizing composite film, punching only normal regions of the polarizing composite film in rectangular shape while appropriately avoiding defective regions, and conveying the punched normal polarizing sheets ("sheet-shaped product" in Patent Document 12) to the lamination position with the liquid-crystal panels by other conveying medium. It should however be noted that this process is not the one which makes it possible to feed only the normal polarizing composite film sheets formed from a continuous web of an optical film laminate to the lamination station with the liquid-crystal panel by means of the carrier film. This technique is a method for once laminating the individualized sheets to other conveying medium before conveying to the lamination position with the liquid-crystal panels, so this technique is not beyond the individualized sheet manufacturing system of liquid-crystal display element.

The applicant of the present application has already made a proposal for a method for laminating the sheets of the optical film laminate with the liquid-crystal panels in Japanese Laid-Open Patent Publications 2009-061498A (Patent Document 13). This method contains an innovative proposal allowing for shifting from a conventional liquid-crystal display element manufacturing system which is designed to carry a plurality of preliminary formed individualized sheets in the manufacturing process of the liquid-crystal display element, and laminate the individualized sheets one by one to respective ones of a plurality of liquid-crystal panels, to a continuous manufacturing system for liquid-crystal display element designed to continuously form a plurality of polarizing composite film sheets and directly laminate the formed sheets to respective ones of a plurality of liquid-crystal panels.

This method comprises, in a series of manufacturing process of the liquid-crystal display elements, steps of peeling a carrier film or a surface protection film from the continuous web of an optical film laminate for inspection to define the normal regions and the defective regions of the optical film laminate, and laminating an alternative carrier film or an alternative surface protection film on the optical film laminate after the inspection. These steps are essential to protect the surface without the adhesive layer and the exposed surface of the adhesive layer of the optical film laminate, as well as to perform an inspection of defects. However, these steps cause not only substantial complexity in the entire system for laminating but also an increase in the number of steps and difficulty in control for each step, and thus causes reduction in the manufacturing speed.

The present invention has been made based on the above prior proposals and through intensive researches and considerations for enabling significantly enhancing product accuracy and manufacturing speed, and drastically improving manufacturing yield, in the manufacture of liquid-crystal display elements.

The prior art documents referred to in the above descriptions are listed below.

Patent Document 1: Japanese Laid-Open Patent Publication 2003-161935A
Patent Document 2: Japanese Patent No. 3616866B
Patent Document 3: Japanese Patent Publication 62-14810B
Patent Document 4: Japanese Laid-Open Patent Publication 2002-23151A
Patent Document 5: Japanese Laid-Open Patent Publication 2004-144913A
Patent Document 6: Japanese Laid-Open Patent Publication 2005-298208A
Patent Document 7: Japanese Laid-Open Patent Publication 2006-58411A
Patent Document 8: Japanese Laid-Open Patent Publication 2004-361741A
Patent Document 9: Japanese Patent No. 3974400B
Patent Document 10: Japanese Laid-Open Patent Publication 2005-62165A
Patent Document 11: Japanese Laid-Open Patent Publication 2007-64989A
Patent Document 12: Japanese Laid-Open Patent Publication 2007-140046A
Patent Document 13: Japanese Laid-Open Patent Publication 2009-061498A

DISCLOSURE OF THE INVENTION

Problem to be Solved by the Invention

The VA-type and IPS-type liquid-crystal panels are advantageous over TN-type liquid-crystal panels from the viewpoint of manufacture in that there is no restriction in the VA and IPS-types that two polarizing sheets are required to be laminated to respective ones of front and rear surfaces of the liquid-crystal panel in 45 degrees oblique with respect to the polarization axis of the polarizing sheet on the respective sides of the liquid-crystal display element, as experienced in the manufacture of TN-type liquid-crystal panels, due to the viewing angle characteristics inherent to the orientation of the liquid-crystal. Therefore, it is possible to carry out a process for continuously manufacturing liquid-crystal display elements using the VA-type and IPS-type liquid-crystal panels, while feeding an optical film laminate, by continuously laminating the sheets prepared by cutting the optical film laminate in the transverse direction with respect to the feed direction of the optical film laminate with the respective ones of a plurality of the liquid-crystal panels. In addition, when the optical film laminate is being fed, normal polarizing sheets having no defect and defective polarizing sheets having defects defined by the preliminary inspection of a comprised continuous polarizing composite film are being formed, and if only the normal polarizing sheets are laminated to respective ones of a plurality of liquid-crystal panels to make liquid-crystal display elements, without interrupting the feed of the optical film laminate, it becomes possible to obtain enhanced product accuracy and manufacturing speed as well as significantly improved production yield in the manufacture of liquid-crystal display elements.

It is therefore an object of the present invention to provide a method and system for continuously forming defective sheets having defects and normal sheets having no defect both determined in a preliminary inspection, while feeding an inspected continuous optical film laminate to the lamination position, and for making the formed defective sheets not to be laminated to liquid-crystal panels without interrupting the feed of the inspected continuous optical film laminate, and thereby obtaining enhanced product accuracy and manufacturing speed as well as significantly improved production yield in the manufacture of liquid-crystal display elements.

Means for Solving the Problem

The above mentioned object can be achieved by providing a method and system for preparing a continuous web of an optical film laminate provided with a mark based on information of defect detected in a preliminary inspection of a polarizing composite film, reading the mark provided on the inspected optical film laminate while continuously feeding the inspected optical film laminate in a continuous manufacturing system of liquid-crystal display element, and laminating only the normal polarizing sheets to respective ones of a plurality of liquid-crystal panels, the normal polarizing sheets being the one determined as containing no defect among the sheets defined between respective two longitudinally adjacent ones of slit lines on the optical film laminate based on the mark.

According to one aspect of the present invention, there is provided a method for continuously manufacturing liquid-crystal display element by laminating sheets of polarizing composite film with a predefined length formed on a continuous web of an optical film laminate to respective ones of a plurality of liquid-crystal panels, the continuous web of the optical film laminate comprising a polarizing composite film with an adhesive layer and a carrier film releasably laminated to the adhesive layer and having a width corresponding to either of a long or short side of the liquid-crystal panel. The method comprises steps of continuously feeding the continuous web of the optical film laminate to a slitting position, measuring a feed length of the optical film laminate and calculating a length measurement data based on the feed length, detecting a mark at a position before reaching to the slitting position while feeding the optical film laminate, the mark indicating a position of defect in a polarizing composite film which is detected in a preliminary inspection, the mark being provided on the optical film laminate, calculating positions for forming slit lines on the optical film laminate in a perpendicular direction with respect to the lengthwise direction of the optical film laminate based on the mark detected and the length measurement data, sequentially forming the slit lines at a side opposite to the carrier film to a depth reaching a surface of the carrier film adjacent to the adhesive layer at the slitting position based on the positions for forming the slit lines, determining whether the polarizing composite film sheet defined between two longitudinally adjacent ones of the slit lines is a defective polarizing sheet with the mark or a normal polarizing sheet without the mark, peeling a sheet determined to be the normal polarizing sheet from the carrier film, and feeding liquid-crystal panel to a lamination position so as to be aligned with the normal polarizing sheet and laminating the normal polarizing sheet to the liquid-crystal panel.

According to one embodiment of the present invention, when a length of the defective polarizing sheet in the feed direction is the same as or longer than a length of liquid-crystal panel, a plurality of slit lines are formed on the defective polarizing sheet in perpendicular direction with respect to the feed direction so that the length of the defective polarizing sheet becomes shorter than the length of the liquid-crystal panel.

According to one embodiment of the present invention, a position or a position in coordinates of the mark provided on the optical film laminate in the feed direction is substantially the same as a position or a position in coordinates of a defect in the feed direction.

According to one embodiment of the present invention, the step of detecting a mark comprises a step of identifying an existence of the mark by determining a difference of luminous intensity between light reflecting on or transmitting through the mark to incident to a light detecting unit, and light reflecting on or transmitting through regions other than the mark to incident to the light detecting unit. The provided mark preferably has an axisymmetrical shape having at least two axisymmetrical axes, wherein lengths of two perpendicular axisymmetrical axes of the mark are different each other, and an angle formed by a longer axis of the axisymmetrical axes of the mark and the feed direction of the optical film laminate is smaller than 45 degrees.

According to one embodiment of the present invention, the method further comprises a step of removing a sheet determined to be defective so as not to laminate the sheet to liquid-crystal panel, the defective polarizing sheet being among the sheets of a polarizing composite film defined between respective two adjacent ones of slit lines sequentially formed on the optical film laminate. The step of removing a sheet determined to be defective so as not to laminate the sheet to liquid-crystal panel comprises removing the defective polarizing sheet from a feed path of the optical film laminate by moving a part of the optical film laminate including the defective polarizing sheet to a dummy film feed path when the defective polarizing sheet defined on the optical film laminate reaches to a removal position to laminate the defective polarizing sheet to the dummy film. According to another embodiment of the present invention, the step of removing a sheet determined to be defective so as not to laminate the sheet to liquid-crystal panel comprises removing the defective polarizing sheet from the feed path of the optical film laminate by feeding a dummy film to the lamination position when the defective polarizing sheet defined on the optical film laminate reaches to the lamination position to laminate the defective polarizing sheet to the dummy film.

According to a second aspect of the present invention, there is provided a system for continuously manufacturing liquid-crystal display elements by laminating sheets of polarizing composite film with a predefined length formed on a continuous web of an optical film laminate to respective ones of a plurality of liquid-crystal panels, the continuous web of the optical film laminate comprising a polarizing composite film with an adhesive layer and a carrier film releasably laminated to the adhesive layer and having a width corresponding to either of a long or short side of the liquid-crystal panel. The system comprises an optical film laminate feed unit for continuously feeding the continuous web of the optical film laminate from a roll of the continuous web of the optical film laminate to a slitting position, a measuring unit for measuring a feed length of the optical film laminate and calculating a length measurement data based on the feed length, a mark detecting unit for detecting a mark at a position before reaching to the slitting position while feeding the optical film laminate, the mark indicating a position of defect in the polarizing composite film which are detected in a preliminary inspection, the mark being provided to the optical film laminate, a slitting position calculation means for calculating positions for forming slit lines on the optical film laminate in a perpendicular direction with respect to the lengthwise direction of the optical film laminate based on the mark detected and the length measurement data, a slit forming unit for sequentially forming the slit lines at a side opposite to the carrier film to a depth reaching a surface of the carrier film adjacent to the adhesive layer based on the positions for forming the slit lines, a control unit for determining the polarizing composite film sheet defined between two longitudinally adjacent ones of the slit lines is a defective polarizing sheet with the mark or a normal polarizing sheet without the mark, a peeling unit for peeling a sheet determined to be a normal polarizing sheet from the carrier film, and a lamination unit for feeding liquid-crystal panel to a lamination position so as to be aligned with the normal polarizing sheet and laminating the normal polarizing sheet to the liquid-crystal panel.

According to one embodiment of the present invention, the mark detecting unit comprises a light source, a light detecting unit arranged on the same side or the opposite side of the optical film laminate with respect to the light source, and a control unit for receiving information from the light detecting unit. The control unit identifies an existence of the mark by determining a difference of luminous intensity between light reflecting on or transmitting through the mark and received by a light detecting unit, and light reflecting on or transmitting through regions other than the mark and received by the light detecting unit.

BRIEF DESCRIPTION OF THE DRAWINGS

FIG. 7 is a table showing a defect inspection unit, types of defect and a defect detection method according to one embodiment of the present invention.

FIG. 16 is a diagram showing a defective polarizing sheet removal unit which operates to identify or discriminate a defective sheet, in the continuous manufacturing system of liquid-crystal display element according to one embodiment of the present invention.

FIG. 20 is a table showing a detection ratio of a mark provided on an optical film laminate in terms of shapes of marks.

BEST MODE FOR CARRYING OUT THE INVENTION

In this specification, a film on which an adhesive layer is formed on one surface to be laminated with a liquid-crystal panel of a polarizer laminated and having a protective film on one or each of opposite surfaces is referred as "a polarizing composite film," and sheets rectangularly shaped from the polarizing composite film, are referred as "a polarizing composite film sheet" or simply "a sheet," rather than the commonly called name "polarizing plate." In addition, when a sheet is formed from a polarizing composite film having a surface-protection film and a carrier film attached thereto, and when this sheet has to be distinguished from "a polarizing composite film sheet", it is referred as "an optical film sheet", and a sheet formed from the surface-protection film or the carrier film included in the polarizing composite film is respectively referred as "a surface-protection film sheet" or "a carrier film sheet" respectively.

The present invention will now be described with reference to specific embodiments illustrated in the accompanying drawings.

Figure 3:
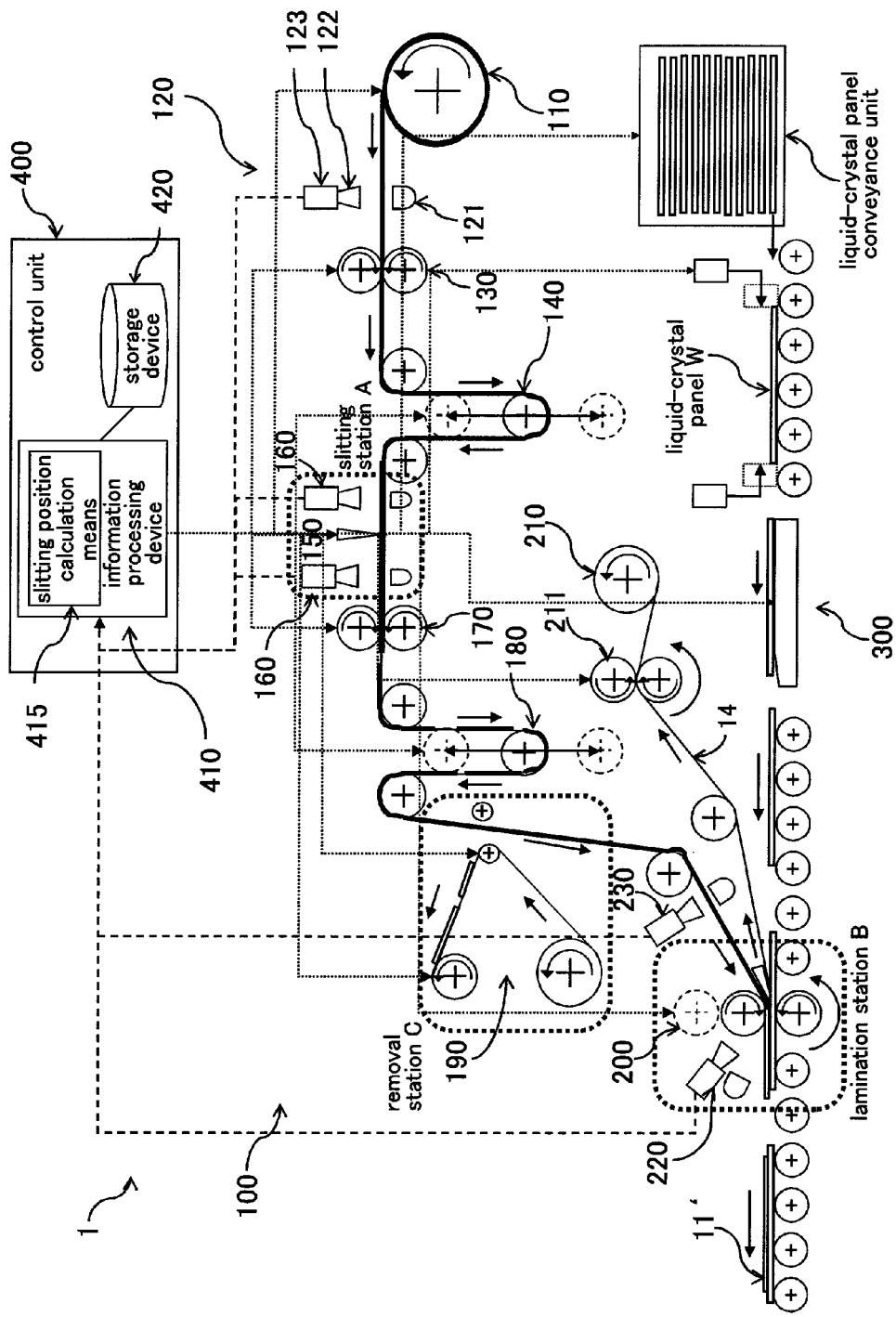
FIG. 3 is a schematic diagram showing a continuous manufacturing system of liquid-crystal display element according to one embodiment of the present invention.

1. Configuration of Continuous Manufacturing System of Liquid-Crystal Display Elements FIG. 3 is a schematic diagram showing a continuous manufacturing system 1 of liquid-crystal display elements. The system 1 comprises an optical film laminate feed unit 100 mounted with a roll of the optical film laminate provided with marks based on information of defects (hereinafter, referred as a marked optical film laminate), a liquid-crystal panel conveyance unit 300 for conveying liquid-crystal panel to which each of normal polarizing sheets formed from a continuous web of the marked optical film laminate being fed is to be laminated, and a control unit 400 for controlling overall operation of the optical film laminate feed unit 100 and the liquid-crystal panel conveyance unit 300. The system 1 comprises a slitting station A for forming a plurality of polarizing composite film sheets, a removal station C for removing defective polarizing composite film sheets, and a lamination station B for laminating normal polarizing sheets to respective ones of liquid-crystal panel. The lamination station B and the removal station C may be arranged at one station in the system 1 as will be described later.

Figure 4:
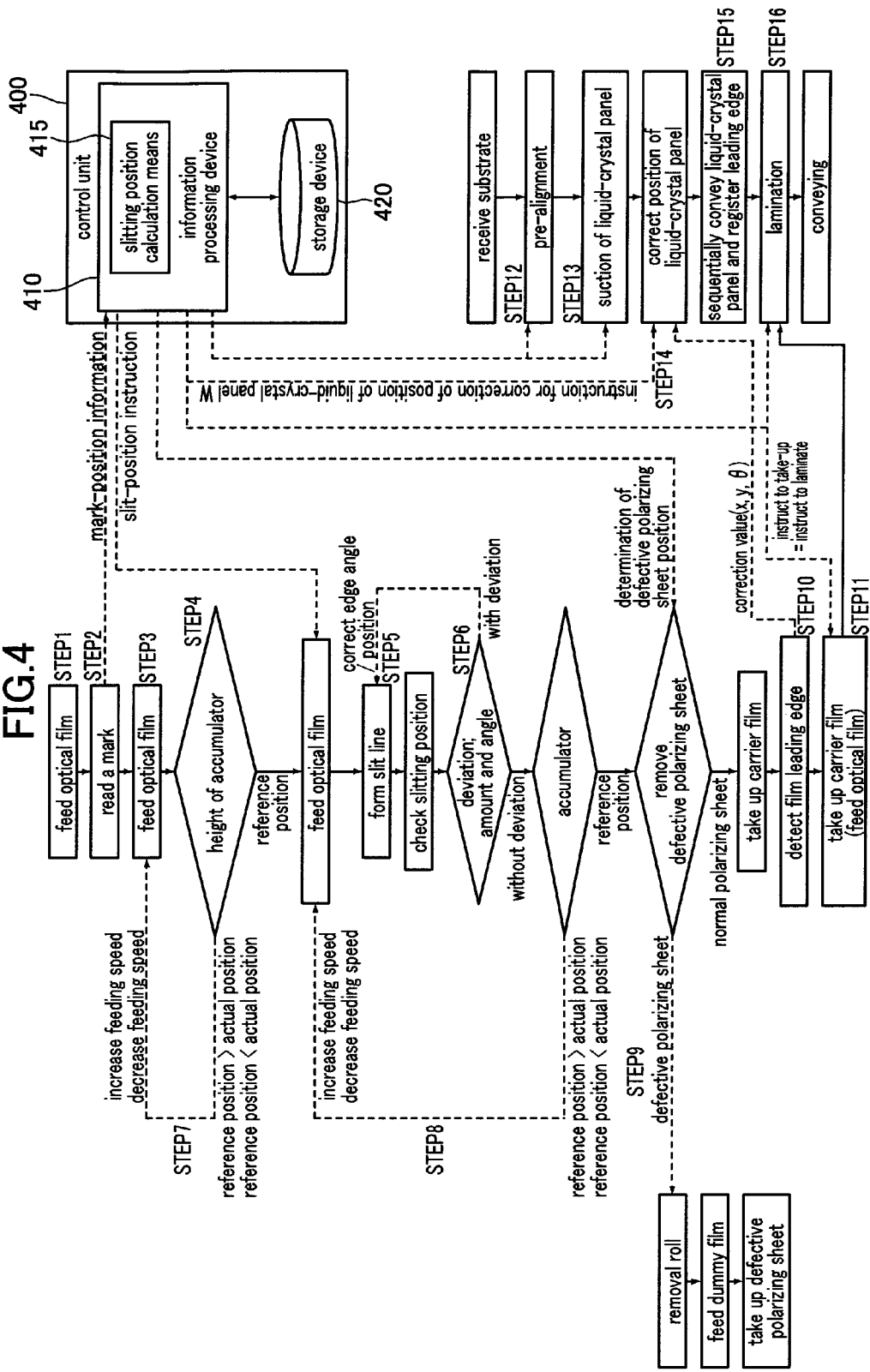
FIG. 4 is a flowchart showing manufacturing steps in the system as shown in FIG. 3.

The optical film laminate feed unit 100 comprises a support rack 110 for rotatably mounting a roll of a continuous web of a marked optical film laminate 10, a mark reading unit 120 for reading marks, a film feed unit 130 including a feed roller, a speed adjustment unit 140 including a dancer roller for providing a constant speed of film feeding, a slitting unit 150 for forming slit lines on the marked optical film laminate at the slitting station A, a slit line position checkup unit 160 for checking positions of slit lines at the same slitting station A, another film feed unit 170 including a feed roller, another speed adjustment unit 180 including a dancer roller, a defective polarizing sheet removal unit 190 provided at the removal station C for removing defective polarizing sheets from a carrier film, a lamination unit 200 including a pair of lamination rollers provided at the lamination station B for peeling normal polarizing sheets from the carrier film to laminate them to respective ones of liquid-crystal panels, a carrier film take-up drive mechanism 210 for taking up the carrier film 14, an edge detection unit 220 provided at the lamination station B for detecting a leading edge of the normal polarizing sheet, and a sheet orientation detection unit 230 for detecting advancing position of the normal polarizing sheet. FIG. 4 is a flowchart showing manufacturing steps in the system 1.

2. Manufacturing Roll of Marked Optical Film Laminate (Configuration of Optical Film Laminate)

Figure 1:
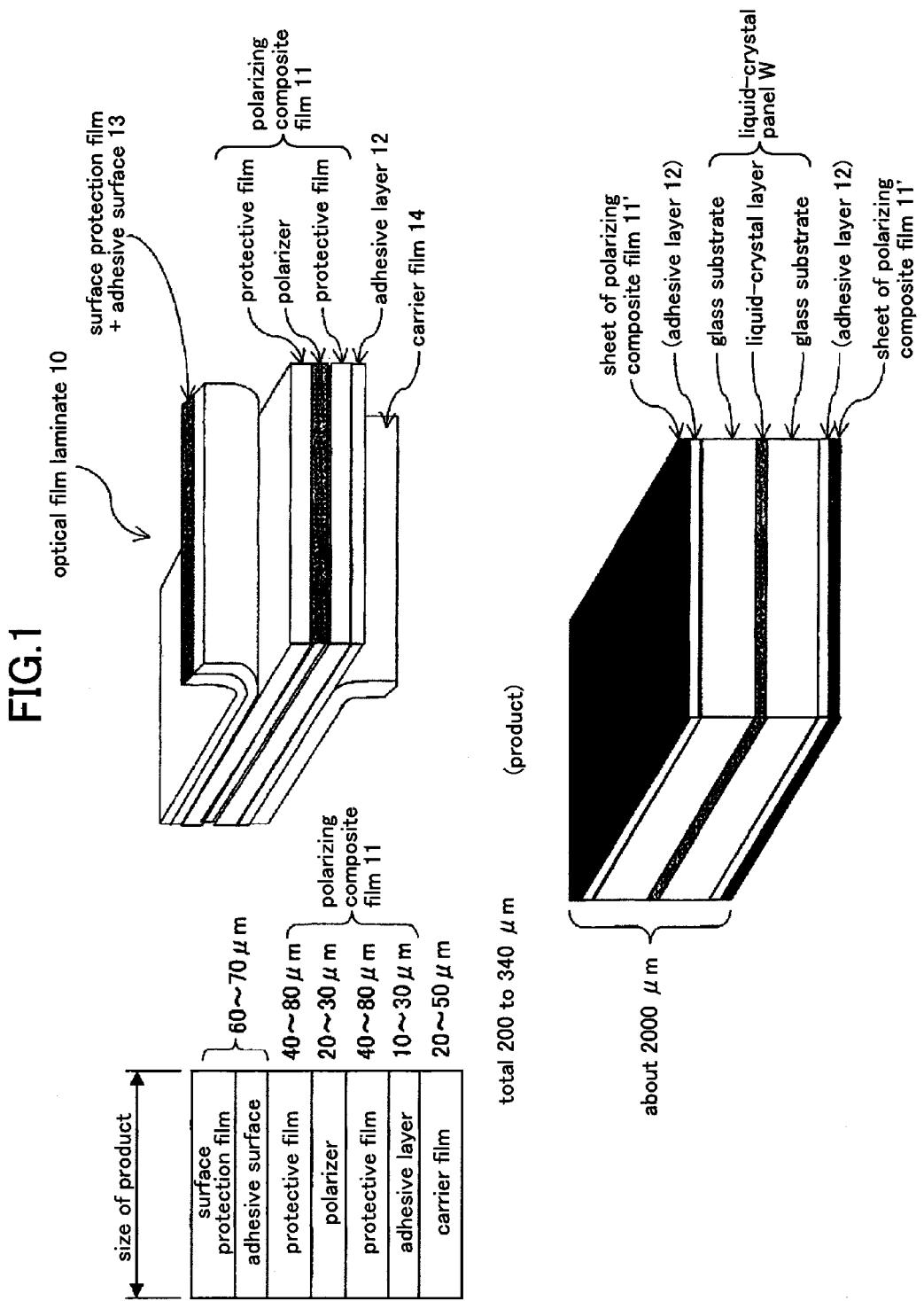
FIG. 1 is a diagram showing a configuration of a continuous web of an optical film laminate for use in continuous manufacturing of liquid-crystal display element.

The roll of a marked optical film laminate 10 mounted on the optical film laminate feed unit 100, as shown in FIG. 1, is the roll of a continuous web of a flexible optical film laminate. The continuous web of the flexible optical film laminate comprises a polarizing composite film 11 having an adhesive layer 12 provided on the surface of a polarizer which has a protective film laminated thereon, the surface being the one which is to be attached to a liquid-crystal panel, a surface protection film 13 having an adhesive surface, and a carrier film 14 releasably laminated on the adhesive layer 12 of the polarizing composite film 11. The roll preferably has substantially the same width as a long side or a short side of the liquid-crystal panel to which a sheet formed from the roll is to be laminated. The protective film to be laminated to one or both surface of the polarizer is a transparent protective film. The carrier film 14 is a releasable film which generally serves as means for protecting the adhesive layer 12 during manufacturing of liquid-crystal display element and is removed and taken up when polarizing composite film sheets are peeled from the optical film laminate before or at laminating to liquid-crystal panel. The carrier film 14 has a function as a carrying medium (carrier) for conveying normal polarizing composite film sheets to the lamination station B, and thus it will hereinafter be referred as a "carrier film."

The polarizing composite film 11 is formed through the following process, for example. First, a PVA (polyvinyl alcohol)-based film having a thickness of about 50 to 80 μm is subjected to a dyeing treatment using iodine and a cross-linking treatment and then subjecting the resultant PVA-based film to an orientation treatment which is carried out by stretching the film in a lengthwise or widthwise direction thereof. As a result, the iodine complex is oriented in the direction parallel to the stretching direction of the PVA-based film to acquire a property of absorbing a polarized light having a plane of oscillation matching with the orientation of the iodine complex to thereby provide a polarizer having absorption axes in the direction parallel to the stretching direction. In order to produce a continuous web of polarizer having an excellent optical property in addition to excellent uniformity and accuracy, it is desirable that the stretching direction of the PVA-based film corresponds to the lengthwise or widthwise directions of the film. Generally, the absorption axis of the polarizer or the optically functional film including such polarizer is parallel to the lengthwise direction of the optically functional film, and the polarizing axis is in the widthwise direction perpendicular to the absorption axis. The thickness of a polarizer is 20 to 30 μm. Then, the protective film for protection of the polarizer is laminated to both of the opposite surfaces of the formed continuous layer of the polarizer with an adhesive. Generally, a transparent TAC (triacetylcellulose)-based film having a thickness of about 40 to 80 μm is often used as the protective film. From the viewpoint of reducing the thickness of the liquid-crystal display element, there may be a case where the protective film is laminated with only one surface of a polarizer. Finally, the acrylic adhesive layer 12 is formed on one side of the polarizer having the protective film laminated thereto. The thickness of the adhesive layer is 10 to 30 μm. The thickness of the polarizing composite film 11 is generally 110 to 220 μm. A continuous layer of polarizer is hereinafter referred as "polarizer."

One of the protective films of the polarizing composite film 11 may be replaced with a phase difference film made of a cycloolefin-based polymer, a TAC-based polymer or the like and having an optical compensation function. There may further be provided a layer of a transparent substrate, such as a TAC-based substrate, having a polymer material, such as a polyester-based polymer or a polyimide-based polymer applied/arranged thereto and then cured. Further, in the case of a polarizing composite film to be laminated to the backlight side of the liquid-crystal display element, it may be possible to provide an additional function by laminating a brightness enhancement film to the backlight side protective film of the polarizer. In addition, regarding the structure of the polarizing composite film 11, there have been proposed various other variations, such as a technique of laminating a TAC-based film to one of opposite surfaces of the polarizer and laminating a PET film to the other surface of the polarizer.

Typically, a PET (polyethylene terephthalate)-based film is used for each of the carrier film 14 and the surface protection film 14. Both of the carrier film 14 and the surface-protection film 14 are so-called "manufacturing-process materials" which are to be peeled and removed prior to the final stage of the manufacturing process of the liquid-crystal display element, and are to be used for protecting the non-adhesive surface from being soiled or damaged, and also protecting the exposed surface of the adhesive layer, of the polarizing composite film 11, during the manufacturing process of the liquid-crystal display elements.

One of the methods for forming an adhesive layer on a polarizing composite film including a polarizer and a protective film laminated on one or both of opposite surfaces of the polarizer devoid of an adhesive layer for laminating to a liquid-crystal panel W comprises a step of laminating a carrier film 14 having a transferable adhesive layer formed thereon, to the surface of the polarizing composite film to be laminated to the liquid-crystal panel W. A specific transfer technique is as follows. In a manufacturing process of the carrier film 14, the carrier film is subjected to a releasing treatment at the surface which is to be laminated to the polarizing composite film at the surface of the polarizing composite film which is to be laminated to the liquid-crystal panel W, and then a solvent containing adhesive is applied to the treated surface and dried to form an adhesive layer on the carrier film 14. Then, the carrier film 14 having the formed adhesive layer is laminated to the polarizing composite film, for example, while feeding out the carrier film 14 and feeding out the polarizing composite film in the same manner, so that the adhesive layer formed on the carrier film 14 can be transferred to the polarizing composite film 11, and the adhesive layer is formed. Alternatively, instead of the adhesive layer being formed in this manner, the adhesive layer 12 may be formed by directly applying a solvent containing adhesive to the surface of the polarizing composite film to be laminated to the liquid-crystal panel, and drying the same.

The surface-protection film 13 typically has an adhesive surface. Unlike the adhesive layer 12 of the polarizing composite film 11, the adhesive surface must be peeled from the polarizing sheet 11' of the polarizing composite film together with a surface-protection film sheet when the surface-protection film sheet is peeled and removed from the polarizing sheet 11 during the manufacturing process of the liquid-crystal display elements. FIG. 1 (product) shows the state after the surface-protection film sheet is peeled and removed. It should further be noted that, irrespective of whether the polarizing composite film 11 has a surface-protection film 13 laminated thereon, it may be possible to provide the polarizing composite film 11 at the surface of the protective film on the visible side of the polarizing composite film with a hard coat treatment for protecting the outermost surface of the liquid-crystal display element, and/or a surface treatment for obtaining an anti-glare effect or the like, such as an anti-glare treatment.

(Manufacturing Marked Roll)

A method and system for manufacturing a roll of a marked optical film laminate will now be described with reference to FIG. 5 and FIG. 6.

Figure 5:
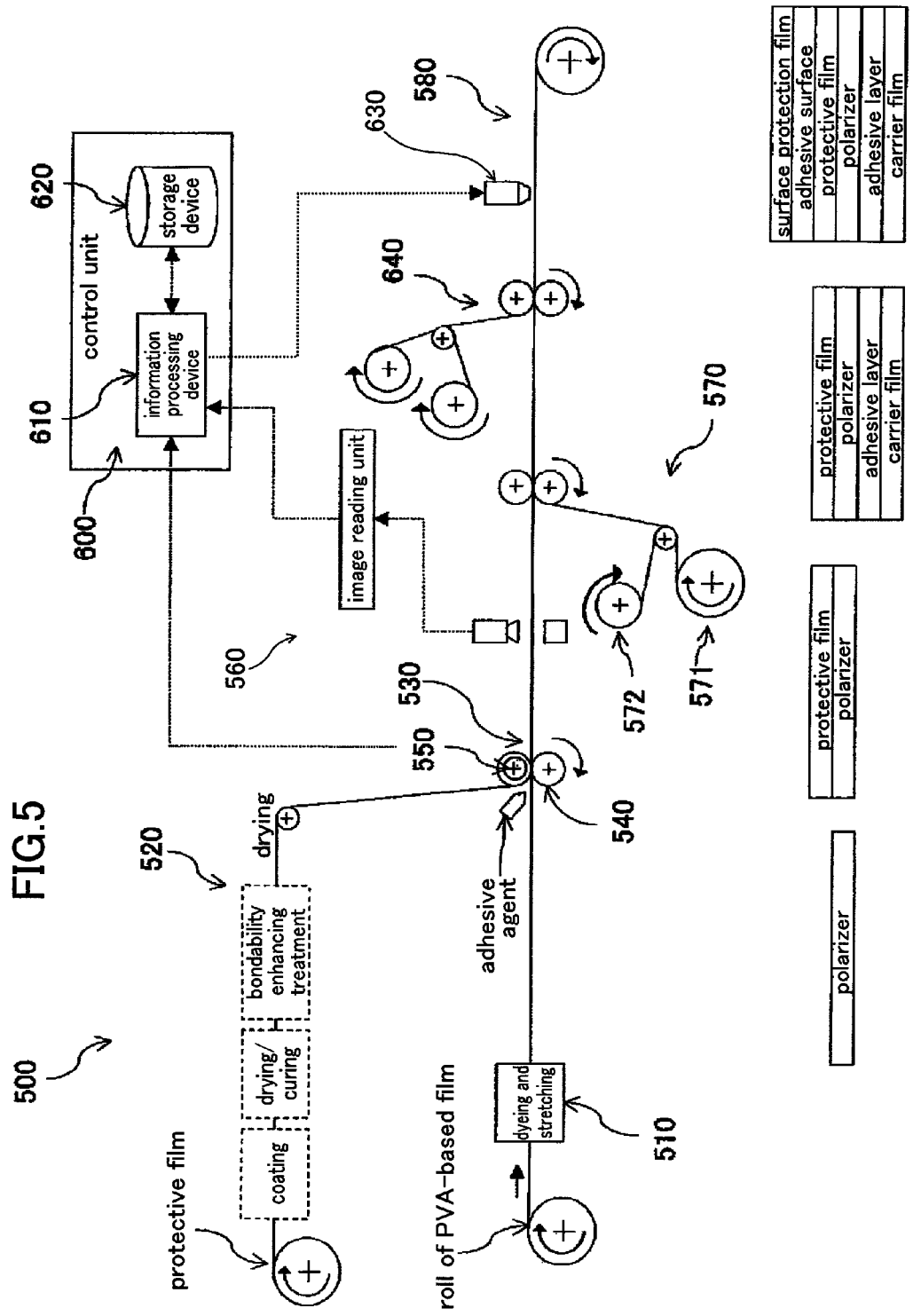
FIG. 5 is a conceptual diagram showing a system for manufacturing a roll of an optical film being provided with a mark for use in a continuous manufacturing system of liquid-crystal display element according to one embodiment of the present invention.

FIG. 5 is a conceptual diagram showing a system 500 for manufacturing a roll of a continuous web of a marked optical film laminate. The system 500 comprises a polarizer manufacturing line 510 for manufacturing a continuous web of polarizer, a protective film manufacturing line 520 for manufacturing a protective film to be laminated to the polarizer, and a manufacturing line 530 for producing a roll of an optical film laminate 10 by laminating the carrier film 14 and the surface protection film 13 to a polarizing composite film including a polarizer on which the protective film is laminated (this is a polarizing composite film devoid of an adhesive layer and is referred as "polarizing composite film 110" for differentiating it from the polarizing composite film 11 having an adhesive layer formed thereon). FIG. 6 is a flowchart showing manufacturing steps in the system 500.

The manufacturing line 530 for producing a polarizing composite film comprises steps of inspecting defects in the polarizing composite film 110 by an inspection unit 560, feeding a carrier film 14 having a transferable adhesive layer 12 formed thereon for laminating the carrier film 14 on the polarizing composite film 110, feeding a surface protection film for laminating the surface protection film 13 through the adhesive layer to a surface of the polarizing composite film 110 opposite to the surface on which the carrier film 14 is laminated, marking for providing marks indicating information of defect on either one of surfaces of the polarizing composite film 110, the surface protection film 13 or the carrier film 14, and winding the marked optical film laminate into a roll.

The polarizer manufacturing line 510 handles a roll of PVA-based film which provides the substrate of the polarizer and is mounted in a rotatable manner. The line 510 includes a sub-line for subjecting the PVA-based film to processes of dyeing, cross-linking, stretching and then drying while the film is being unrolled from the roll and passed through the line 510 by means of a lamination drive mechanism 540 or other drive mechanism (not shown). The protective film manufacturing line 520 handles a rotatably mounted roll of the transparent TAC-based film providing the substrate of the protective film, and a sub-line for subjecting the transparent TAC-based film being unrolled from the roll by means of a lamination drive mechanism 540 or other drive mechanism (not shown), to a saponifying treatment followed by drying. The manufacturing line 530 for producing a polarizing composite film 110 includes a sub-line for applying an adhesive consisting primarily of a polyvinyl alcohol-based resin to an interface between the polarizer and the protective film, and drying the adhesive to bond them together through an adhesive layer.

The manufacturing line 530 for producing a polarizing composite film 110 comprises a lamination drive mechanism 540 including a pair of lamination rollers and a length measurement unit 550 having an encoder incorporated therein, and includes a measurement process measuring a fed-out distance of the polarizing composite film 110 from a leading edge. The lamination rollers press and laminate the polarizer and the protective film to form the polarizing composite film 110.

The inspection unit 560 comprises an image reading unit 590 including for example a CCD camera. The inspection unit 560 is adapted to perform, for example, reflection inspection, transmission inspection, oblique transmission inspection and cross-Nichol transmission inspection, and transmits image data of defect obtained in the inspection to an information processing device 610. The image data of defect is associated with a length measurement data measured by a length measuring unit 550 connected to the information processing device 610. The information processing device 610 generates information of defect related with a position or a position in coordinates of a defect in the polarizing composite film 110 by associating the image data obtained by the image reading unit 590 and the length measurement data based on the fed-out distance from the leading edge of the polarizing composite film 110 obtained by the length measuring unit 550, and stores the information of defect in a storage device 620. The information processing device 610 determines a position of a mark based on the information of defect. A mark providing unit 630 provides a mark on the optical film laminate based on the information of defect generated from the image data of defects. Detail of providing a mark including the mark providing unit 630 will be described later.

In the system 500, the polarizing composite film 11 must be manufactured by forming the adhesive layer 12 on the polarizing composite film 110 after detecting defects on the surface and inside of the polarizing composite film 110. Therefore, the system 500 further comprises a carrier film feed unit 570 provided with a roll of the carrier film 14 having the adhesive layer 12. The carrier film 14 is formed using PET (polyethylene terephthalate)-based film having a thickness of 20 to 50 μm provided as a substrate in a carrier film manufacturing line (not shown) in advance. A transferable adhesive layer having a thickness of 10 to 30 μm is formed on one of the surfaces of the carrier film 14 by subjecting the PET film to a releasing treatment, applying a solvent containing adhesive to the surface and then drying. By releasably laminating the carrier film 14 to the polarizing composite film 110, the adhesive layer is transferred and an optical film laminate including the polarizing composite film 11 having the adhesive layer 12 being formed thereon is formed.

The system 500 may comprise a surface protection film feed unit 640 for laminating the surface protection film 13 through the adhesive surface on a surface of the polarizing composite film 110 opposite to the surface on which the carrier film 14 is laminated. The system 500 typically comprises the mark providing unit 630 for providing a mark on one of surfaces of the surface protection film 13 or the carrier film 14 after laminating these films. The system 500 further comprises an optical film laminate take-up drive mechanism 580 for winding the optical film laminate after providing a mark by the mark providing unit 630.

In case where two protective films are laminated on the opposite surfaces of the polarizer, the system 500 may include two protective film manufacturing lines 520, 520' (the protective film manufacturing line 520' is omitted in FIG. 5). Further, the protective film manufacturing line 520 may additionally include a treatment sub-line for, before a protective film is laminated to the polarizer, subjecting the surface of the protective film (non-laminated surface) to a hard coat treatment and/or anti-glare treatment.

Figure 6:
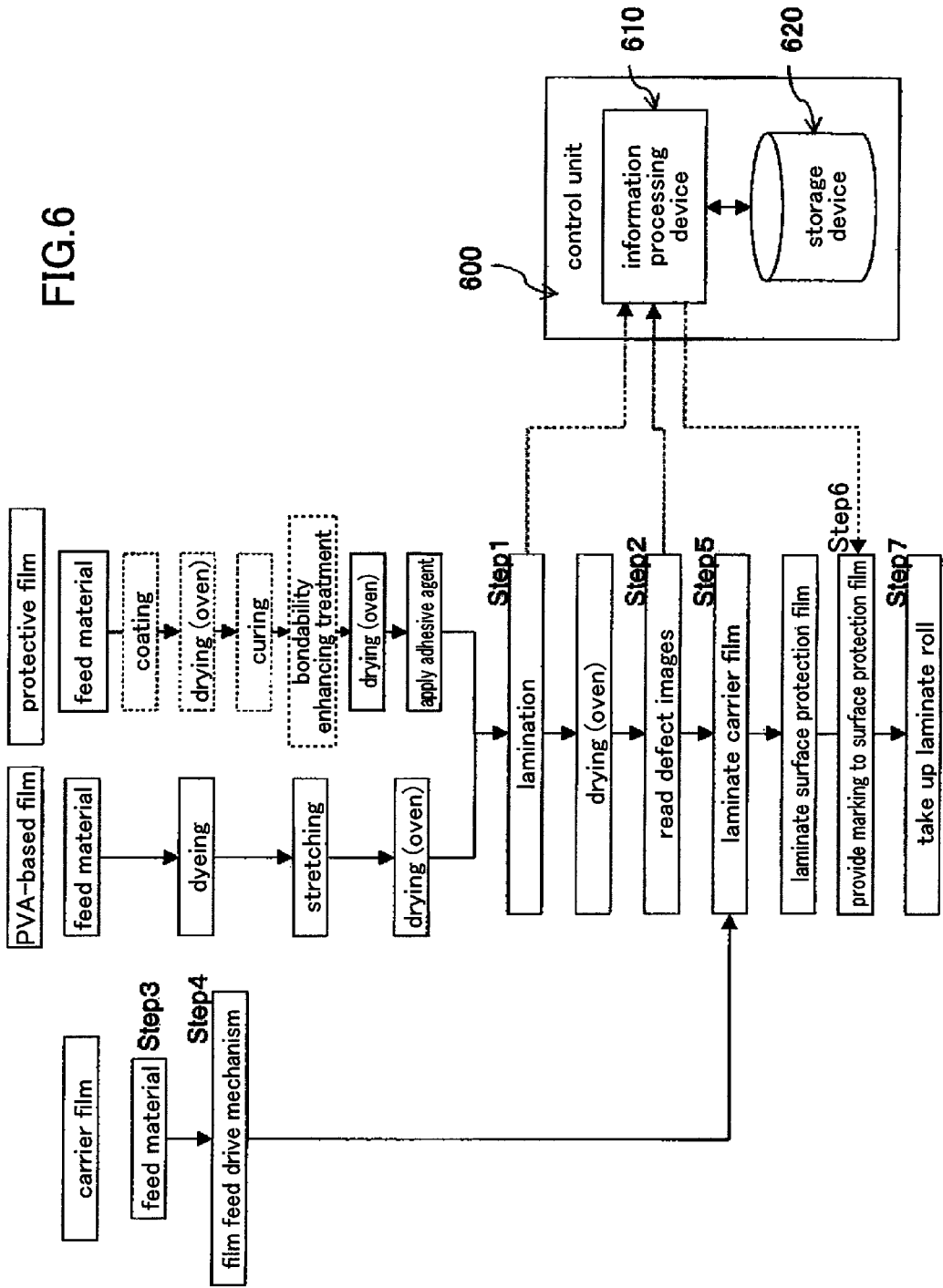
FIG. 6 is a flowchart showing manufacturing steps in the system as shown in FIG. 5.

Referring to the flowchart of FIG. 6, in step 1, the lamination drive mechanism 540 laminates a protective film on one of the opposite surfaces of a polarizer to form the polarizing composite film 110. In step 2, the inspection unit 560 detects defects if any in the polarizing composite film 110 while moving the film. In step 3, a roll of the carrier film 14 is rotatably mounted on the support rack 571. In step 4, the carrier film 14 is fed out from the roll having the adhesive layer releasably formed thereon being exposed by a releasable film take-up drive mechanism 572 and the optical film laminate take-up drive mechanism 580. In step 5, the carrier film 14 is releasably laminated through the adhesive layer to the polarizing composite film 110 to form the polarizing composite film 11 having the adhesive layer 12 formed thereon.

The information processing device generates information of defect based on the image of defect detected in the step 2. The generated information of defect is recorded on a surface of the surface protection film 13 or the carrier film 14 by the mark providing unit 630 in step 6. Finally, in step 7, the formed optical film laminate is wound by the optical film laminate take-up drive mechanism 580 and the roll of the marked optical film laminate 10 is completed.

Although the descriptions have been made herein with respect to a process wherein the step of forming the adhesive layer 12 on the polarizing composite film 11 is carried out, simultaneously with the step of releasably laminating the carrier film 14 on the adhesive layer 12, it is to be understood that the adhesive layer 12 may be preliminarily formed on the polarizing composite film 11. Further, the adhesive surface of the surface protection film 13 may be additionally laminated on the surface of the polarizing composite film 11 opposite to the surface on which the carrier film 14 is laminated by means of the lamination unit 640, irrespective of whether the protective film is subjected to the hard coating treatment or anti-glare treatment, before the protective film is laminated to the polarizer. In this case, the manufactured optical film laminate has a structure having the carrier film 14 and the surface-protection film 13 laminated on respective ones of the opposite surfaces of the polarizing composite film 11.

The manufacturing method of a roll of marked optical film laminate shown in FIG. 5 and FIG. 6 starts with manufacturing a polarizer and a protective film, and includes inspecting a polarizing composite film having the polarizer and the protective film laminated thereon, forming an optical film laminate by laminating a carrier film and/or a surface protection film to the polarizing composite film, providing a mark on the optical film laminate, and winding the film laminate. However, a manufacturing method of a roll of marked optical film laminate is not limited to the one described above. In another manufacturing method of a roll of marked optical film laminate, it is possible to provide a mark on a surface of a polarizing composite film (i.e., a surface of a protective film) after inspecting for defect in the polarizing composite film, then manufacture a marked optical film laminate by laminating a carrier film and/or a surface protection film thereon and wind the film laminate. In yet another manufacturing method of a roll of marked optical film laminate, for example, a roll of a polarizing composite film having a carrier film releasably laminated thereon, or, a roll of a polarizing composite film having a carrier film and a surface protection film releasably laminated thereon is prepared in advance, and the manufacturing of a roll of marked optical film laminate can start with the roll. In this case, the carrier film, or, the carrier film and the surface protection film is once peeled to expose the polarizing composite film for a defect inspection, then the same carrier film that was peeled or another carrier film, or, the same or another carrier film and surface protection film is re-laminated to the polarizing composite film.

(Providing Marks)

The system 500 comprises a mark providing unit 630 for providing a mark to a surface of the carrier film 14 for example as shown in FIG. 5, the mark indicating defect information such as a position and type of defect detected by the defect inspection unit 560 and processed by the information processing device 610. The position where a mark is to be applied may be a position where the position in coordinates of the mark coincides or substantially coincides in widthwise and lengthwise directions of the optical film laminate with the position of the defect, or the position in coordinates of the mark in the lengthwise direction coincides or substantially coincides with the position of the defect in the lengthwise direction (i.e., any position between the position of the defect and the edge of the optical film laminate, with respect to the transverse direction of the optical film laminate). The term "substantially coincides" means a case where a deviation between the position in coordinates where a mark is to be applied (the center of the mark) and the position of a defect is preferably less than ±200 mm, more preferably less than ±50 mm, and most preferably ±10 mm. A mark is preferably provided on the carrier film 14 included in the optical film laminate, but may be provided on the surface protection film 13.

A roll of marked optical film laminate 10 is used in the method and system for continuously manufacturing liquid-crystal display elements according to the present invention. It is extremely important to accurately and swiftly detect a mark provided on the roll by a mark reading unit 120 of the continuous manufacturing system to achieve enhanced product accuracy and manufacturing speed as well as significantly improved production yield in the manufacture of liquid-crystal display elements, which is the problem to be solved by the present invention. Therefore, a mark having an appropriate feature which allows improving mark detection accuracy at the mark reading unit 120 must be provided on the optical film laminate. Features of a mark for improving mark detection accuracy include shape, thickness, optical density and surface roughness of the mark.

The shape of the mark in not specifically limited as long as detection of the mark is surely performed at the continuous manufacturing system of liquid-crystal element. The mark preferably has a simple geometric shape such as a circle, an ellipse, a square, a rectangle, and an oval (also called as a round rectangle). The mark may also have other shapes when desired, for example a more complicated shape such as a star or an aggregate of dots. When the mark reading unit 120 for detecting the mark by a difference of a luminous intensity of light radiated from a light source onto the mark and onto its periphery is used as described later, the mark preferably has a shape such as ink-filled circle, ellipse, square, rectangle, oval or triangle. Specifically, for improving mark detection ratio, the provided mark preferably has an axisymmetrical shape having at least two axisymmetrical axes, wherein lengths of two perpendicular axisymmetrical axes of the mark are different, and, an angle formed by a longer axis of the axisymmetrical axes of the mark and the feed direction of the optical film laminate is smaller than 45 degrees such as a rectangle, an oval or an ellipse, and most preferably a rectangle or an oval. It is possible to improve mark detection ratio by appropriately adjusting a ratio (an aspect ratio) of a longitudinal length of a rectangle or an oval (i.e., a length parallel to a longer axis of the axisymmetrical axes of the mark) and a transverse length (i.e., a length parallel to a shorter axis of the axisymmetrical axes of the mark). The aspect ratio is preferably greater than 1.0:1 and is more preferably greater than 1.5:1. An angle formed by a longer axis of the axisymmetrical axes of the mark and the feed direction of the optical film laminate is preferably smaller than about 10 degrees, more preferably smaller than about 5 degrees and most preferably about zero degree.

The laminate on which the mark has been provided may be wound into a roll. When the mark is of a large thickness, there may be a possibility that a deformation is caused on the laminate by the thickness of the mark when the laminate is wound and produces a new defect on the laminate. Therefore, the thickness of the mark should preferably be smaller than 1.5 μm and more preferably smaller than 1.0 μm to prevent such a deformation. The thickness of the mark referred herein is the maximum value of thickness of the entire mark which is measurable by an optical surface roughness gauge.

The mark for use in the present invention preferably has an optical density of greater than 2.0. Optical density is an absorbancy of a peak wavelength among absorbancy of various wavelengths of the mark and can be measured with a microspectrophotometer. By providing the mark with optical density greater than 2.0, accuracy of mark detection can be improved using the mark reading unit 120 for detecting a mark by a difference of luminous intensity.

Such a mark can be provided using a well-known technique such as using a marker and an inkjet method. The thickness of a mark can be adjusted by the type of ink used for a marker or an inkjet method, a contact pressure between a marker and an optical film laminate, an injection pressure of inkjet or a size of droplet of ink.

It is necessary to appropriately select the type of ink for use in providing a mark to increase an optical density of mark, and it is preferable to use an ink having a high absorption coefficient. The peak absorption wavelength of mark is not limited as long as it is detectable by the mark reading unit 120 provided in the continuous manufacturing system 1 for manufacturing liquid-crystal display elements, and may exist in any one of visible light region, ultra-violet region or ultra-red region. It is preferable that a peak absorption wavelength exists in a wavelength where an absorption coefficient of the polarizing composite film or the optical film laminate is small.

The mark provided on an optical film laminate can bear not only information indicating a position in coordinates of a defect, but also various information such as the type or size of defect by changing the shape of a mark or a color depending on the type or size of the defect, by using a plurality of types of ink having different absorbing wavelengths as ink for the marks.

3. Continuous Manufacture of Liquid-Crystal Display Elements (Mounting a Laminate Roll and Feeding)

A roll of the marked optical film laminate 10 manufactured as above is mounted on the optical film laminate feed unit 100 of the continuous manufacturing system 1 for manufacturing liquid-crystal panels according to the present invention, and is fed out as a continuous web of the optical film laminate. The support rack 110 of the optical film laminate feed unit 100 is preferably provided with an encoder (not shown) for calculating a length measurement data from a fed-out distance of the optical film laminate, and the length measurement data calculated by the encoder is stored in a storage device 420 of a control unit 400. It is possible that the calculation of a length measurement data of the optical film laminate is performed by a measuring unit separately provided in the optical film laminate feed unit 100.

(Detection of Mark)

The mark provided on the optical film laminate fed out from the support rack 110 is detected by the mark reading unit 120. In one embodiment of the present invention, the mark reading unit 120 comprises a light source 121 arranged on either one of the sides adjacent to the upper and lower surfaces of the optical film laminate, a camera 122 provided on the side of the optical film laminate opposite to the side of the light source 121, and a controller 123, as shown in FIG. 3. The light source 121 may be of the type radiating visible light, ultra-violet light or infra-red light. The camera 122 may comprise a lens and a capturing element such as a CCD or CMOS, and may capture either one or both of visible light and/or light other than visible light depending on the type of the light source 121.

Light from the light source 121 is radiated to the mark and the optical film laminate in the vicinity of the mark, which is a part of the optical film laminate where the mark is not provided. A part of radiated light is absorbed by the mark according to its optical density and another part of radiated light is not absorbed by the mark and transmits through the optical film laminate to incident into the camera 122. Light incident into the camera 122 is converted to an electrical signal by the capturing element according to the luminous intensity, and then its information, that is, an image of the mark and the optical film laminate in the vicinity of the mark is sent to the controller 123. The controller 123 converts the information according to the luminous intensity of the mark and the optical film laminate to 256 gradations for example.

The controller 123 calculates a difference of gradation between the mark and the optical film laminate in the vicinity of the mark. Light incident into the camera 122 after transmitting through the mark on the optical film laminate is weak because light from the light source 121 is absorbed by the mark. On the other hand, light incident into the camera 122 after transmitting through the optical film laminate in the vicinity of the mark is stronger than the light through the mark because the light from the light source is not absorbed by the mark and transmits through the optical film laminate. The difference of luminous intensity between the light transmitted through the mark and light transmitting through the optical film laminate in the vicinity of the mark causes a difference of gradation between the mark and the optical film laminate in the vicinity of the mark, and it is possible to determine existence of mark on the optical film laminate depending on magnitude of the difference. The controller 123 compares the difference in the calculated gradation with a predetermined threshold, and if the difference is larger than the threshold, then it determines that the part where intensity of transmitted light is small is the place where the mark is provided. If the difference of gradation is smaller than the threshold, then the controller 123 determines that a mark is not provided on an area of the optical film laminate corresponding to the image obtained by the camera 122. The threshold may be appropriately determined depending on features of the mark, the light source 121, and the camera 122. If the threshold is of a too high value, a mark detection ratio or capability becomes low. On the other hand, if the threshold is too low, the detection ratio or capability of detecting marks with low optical density becomes high, but a risk of false detection also becomes high because of noise.

In FIG. 3, the light source 121 of the mark detection unit 120 is arranged beneath the optical film laminate and the camera 122 is arranged above the optical film laminate. However, both the light source 121 and the camera 122 may be arranged on a same side, either beneath or above the optical film laminate. In this case, the difference of luminous intensity incident into the camera 122 to be compared with a threshold is that between light reflected on a mark and on an area without a mark. The controller 123 may be integrally configured with the camera 122 or be included in the control unit 400.

(Calculation of Slitting Positions)

When the controller 123 determines that the mark is provided to a part of the optical film laminate corresponding to an image obtained by the camera 122, a position is determined to form a slit line by the slitting unit 150 shown in FIG. 3 based on information of a detected mark. The slitting position is calculated by a slitting position calculation means 415 incorporated in the information processing device 410 of the control unit 400 for example. The slitting position calculation means 415 calculates information of position for forming a slit line on the optical film laminate, based on the position in coordinates of a detected mark and a length measurement data of the optical film laminate, as follows. A slitting position information designates positions to form slit lines on the optical film laminate, and the slit lines are formed by the slitting unit 150 in a transverse direction with respect to the lengthwise direction of the optical film laminate at a side opposite to the carrier film to a depth reaching a surface of the carrier film adjacent to the adhesive layer. Such a slit line forming method is sometimes called as "half-cut." Generated slitting position information is stored in the storage device 420.

There is defined a region between two longitudinally adjacent ones of the slit lines, one on the upstream side and the other on the downstream side of the optical film laminate spaced apart a predetermined interval from the one on the upstream side, and the region may be a defect-free, normal region having a predefined length corresponding to the length of one of sides of the liquid crystal panel to which a sheet of polarizer cut out from the region is to be laminated, or a defect-containing, defective region having a length usually smaller than the length of the normal region. The defective region of the polarizing composite film 11 between two adjacent slit lines formed by the slitting unit 150 provides specifically a defective polarizing sheet Xβ to be removed from the optical film laminate (actually, from the carrier film 14) by the defective polarizing sheet removal unit 190. Similarly, the normal region provides a normal polarizing sheet Xα to be peeled from the optical film laminate (actually, from the carrier film 14) and laminated to one of the surfaces of liquid-crystal panel by the lamination unit 200.

Figure 8:
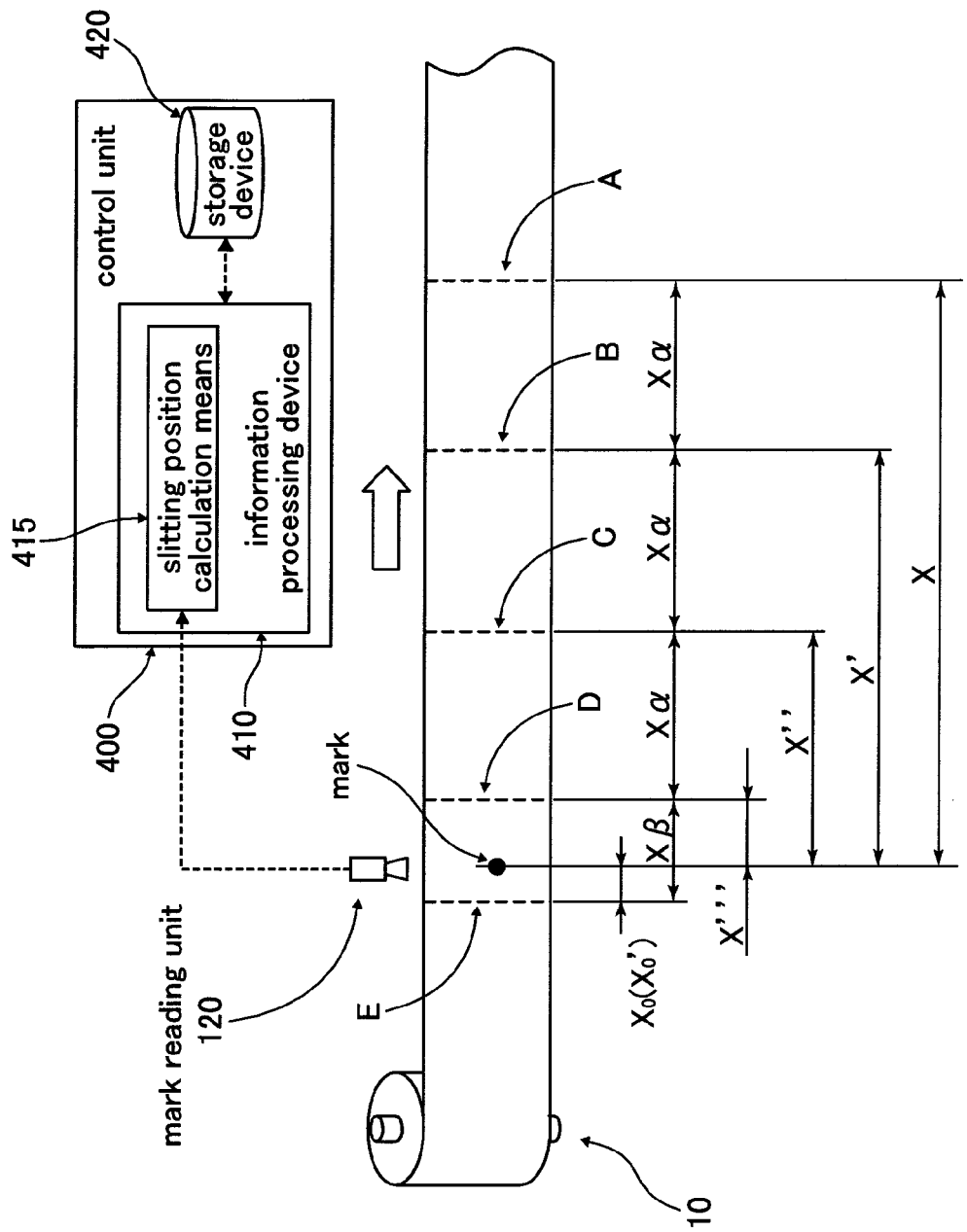
FIG. 8 is a diagram showing a calculating method for calculating a position to form a slit line to separate a defective region and a defect-free region on an optical film laminate being fed.
Figure 9:
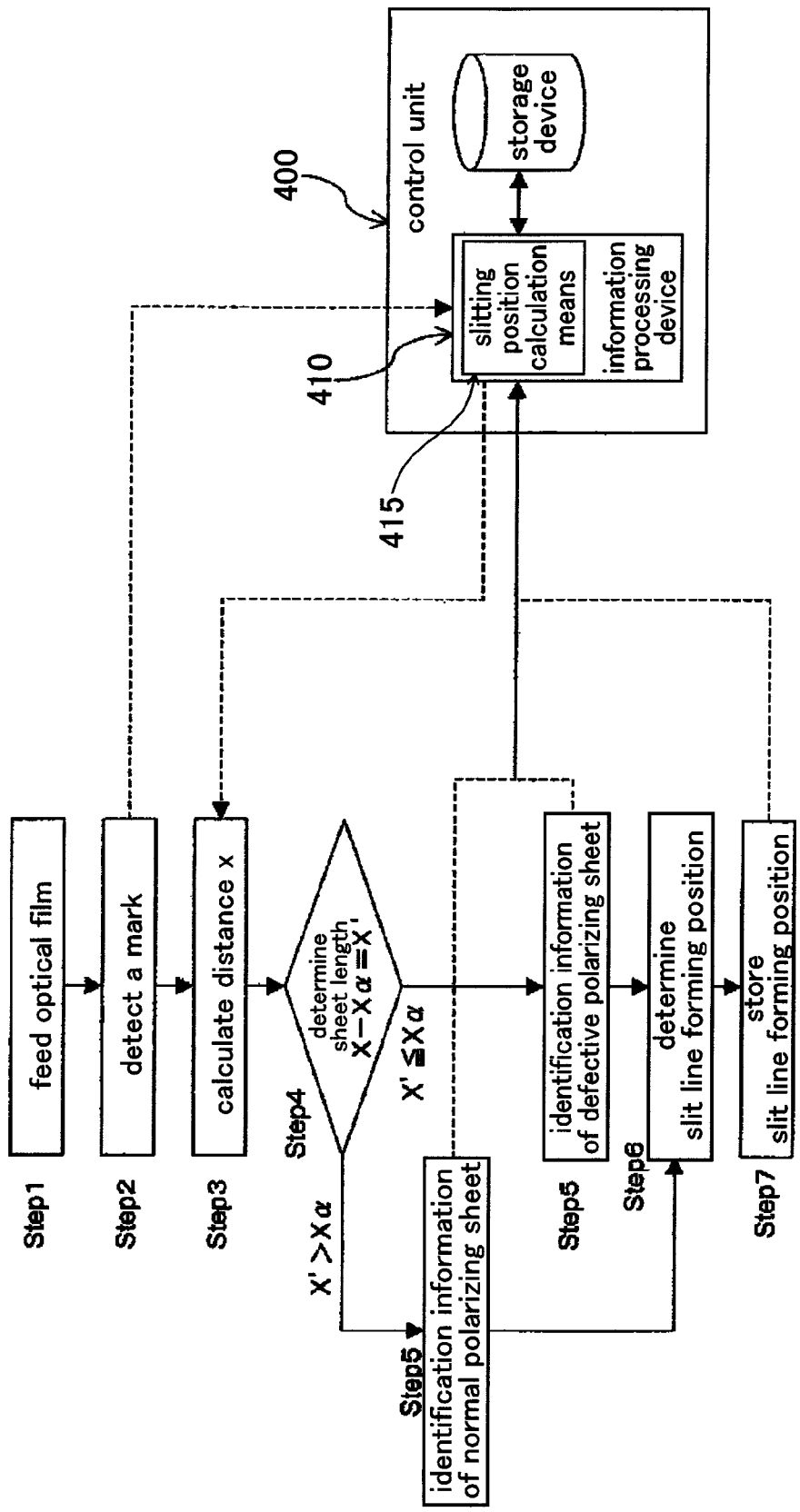
FIG. 9 is a flowchart showing a method for calculating a position to form a slit line on an optical film laminate being fed.
Figure 10:
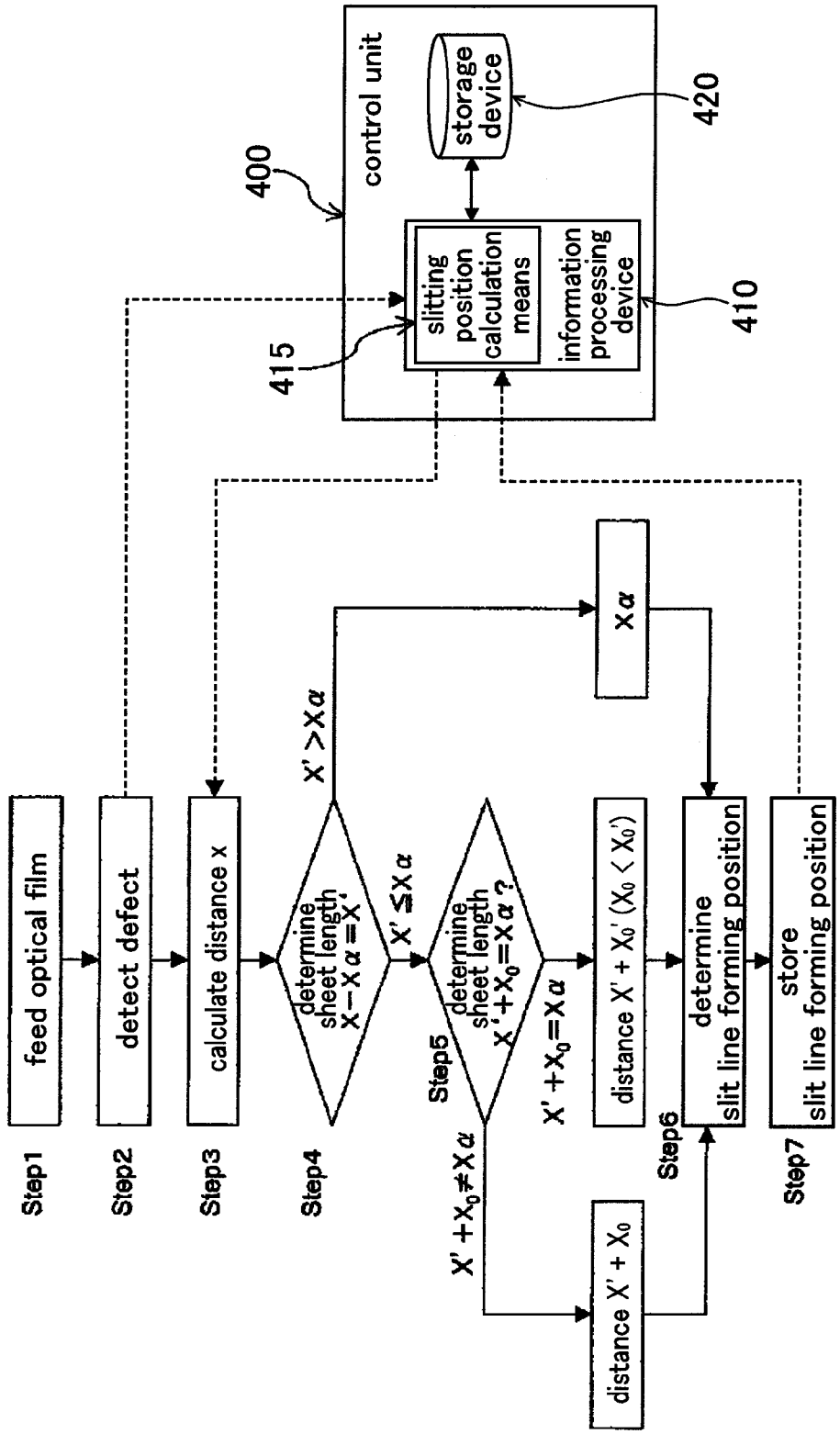
FIG. 10 is a flowchart showing another method for calculating a position to form a slit line on an optical film laminate being fed.
Figure 11:
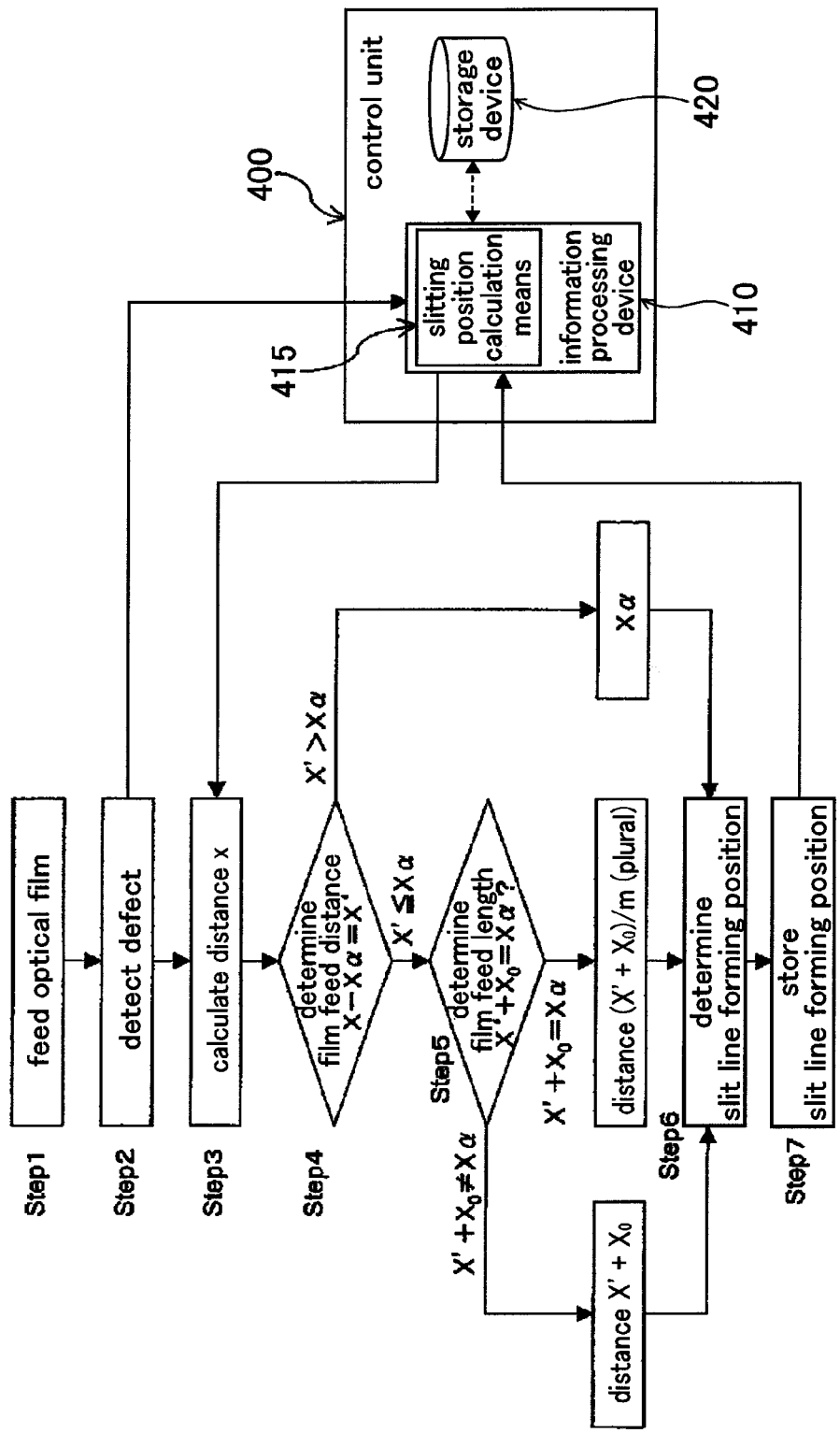
FIG. 11 is a flowchart showing yet another method for calculating a position to form a slit line on an optical film laminate being fed.
Figure 12:
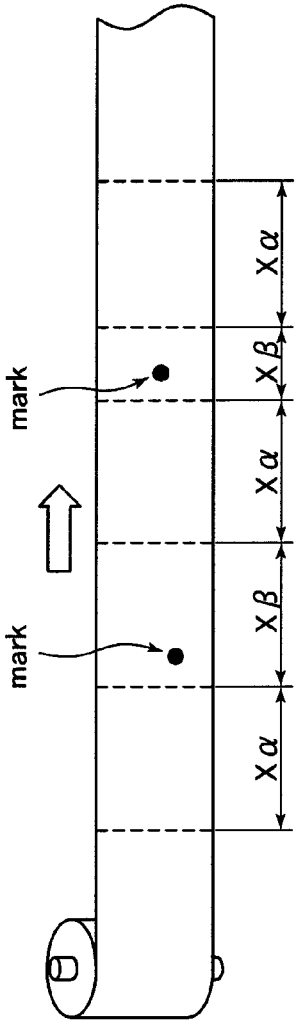
FIG. 12 illustrates how a slitting position information is determined as a result of calculation by the method as shown in FIG. 9.
Figure 13:
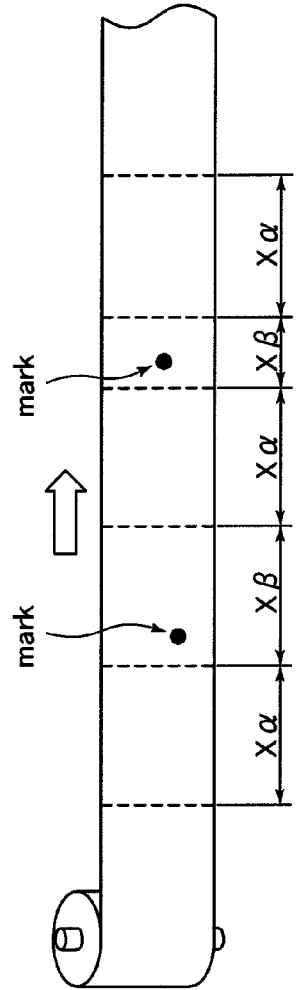
FIG. 13 illustrates how a slitting position information is determined as a result of calculation by the method as shown in FIG. 10.
Figure 14:
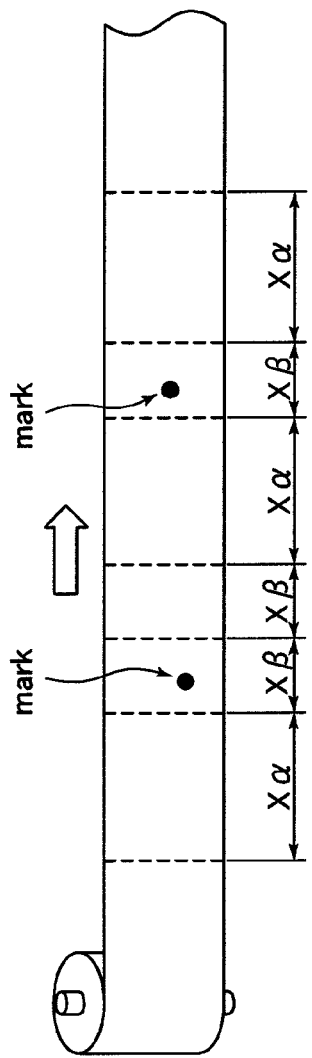
FIG. 14 illustrates how a slitting position information is determined as a result of calculation by the method as shown in FIG. 11.

FIG. 8 is a diagram showing a calculating method for calculating a position to form a slit line to define a defective region or a defect-free normal region on the optical film laminate being fed. FIG. 9 to FIG. 11 are flowcharts showing the methods for calculating a position to form the slit line on the optical film laminate being fed. FIG. 12 to FIG. 14 illustrate how a slitting position information is determined as a result of calculation by the above methods.

Calculation method of slitting position information will be described in the followings with reference to FIG. 8 to FIG. 14. In step 1 in FIG. 9, the optical film laminate is fed out. While the optical film laminate being fed, a length measurement data is obtained from the feed distance of the optical film laminate. In step 2, a mark provided on the optical film laminate is detected by the mark reading unit 120. The information processing device 410 calculates the position in coordinates of the mark based the detected mark and the length measurement data of the optical film laminate. The position in the coordinates of the mark is stored in the storage device 420. In another embodiment of the present invention, a mark provided to the optical film laminate can bear not only information indicating a position in coordinates of a defect, but also various information such a type or size of defect by changing the shape or color of the mark. In this case, the information processing device 410 obtains not only the position in coordinates of the defect but also a type or size of the defect from information of the mark detected by the mark reading unit 120, and stores it in the storage device 420.

In step 3 and step 4, the slitting position calculation means 415 compares a length of a sheet of the optical film laminate and the length xα corresponding to a normal region based on the position in coordinates of the detected defect. First, in step 3, the slitting position calculation means 415 calculates a distance or length x from a position (for example, the position shown by A in FIG. 9 which may be referred as a first slitting position) to the position of the mark. In step 4, the slitting position calculation means 415 calculates a distance (x−xα)=x', where xα is the length of a normal region. The length xα which is the length of the normal region Xα of the optical film laminate is determined by a system administrator based on the size of the liquid-crystal panel and pre-stored in the storage device 420. Then, the slitting position calculation means 415 determines whether the calculated length x' is larger or smaller than the length xα which is the length of the normal region Xα of the optical film laminate pre-stored in the storage device 420.

If a relation x' in FIG. 8 >xα is established, it is understood that a normal polarizing sheet Xα can be obtained from this part of the optical film laminate. Thus the slitting position calculation means 415 determines that a position B on the upstream side of the optical film laminate spaced apart by the length xα from the position A (the first slitting position) to be a next slitting position (a second slitting position) (step 6). Similarly, the slitting position calculation means 415 calculates a length by subtracting the length xα which is the length of a normal region from the length between the second slitting position B to the mark. When the resulting length is larger than the length xα, a position C is determined on the upstream side of the optical film laminate spaced apart by the length xα from the position B (the second slitting position) to be a third slitting position, then similarly a next position D is determined to be a fourth slitting position, and so on.

To the contrary, if the relation x'≤xα is established, i.e., x''' in FIG. 8 ≤xα, it is understood that a normal polarizing sheet Xα cannot be obtained from this part of the optical film laminate. In this case, the slitting position calculation means 415 adds a predetermined length x0 to x''' to calculate a length (x'''+x0)=xβ which is the length of a defective region Xβ. That is, a position E on the upstream of the optical film laminate spaced apart by the length xβ is defined as the slitting position to form a defective polarizing sheet Xβ corresponding to a defective region of the optical film laminate (step 6).

As described above, the slitting position calculation means 415 operates to perform calculations of the following (a) and (b) from information of the mark read by the mark reading unit 120 and the length measurement data calculated from a fed-length of the optical film laminate, and determines these positions as position to form a next slit line (step 6 in FIG. 10).

(a) a distance xα to the position for forming a next slit line, if x'>xα; and (b) a distance (x'+x0=xβ) to the position for forming a next slit line, if x'≤xα.

By the way, if the length (x'+x0=xβ) which is the length of the defective region Xβ becomes equal to the length xα which is the length of the defect-free region Xα, i.e., if (x'+x0)=xα, the information processing device 410 cannot identify or discriminate the defect-free region Xα from the defective region Xβ. This means that the defective region Xβ may not be correctly recognized, so that, for example, the defect-free region xα and the defective region xβ cannot be discriminated from each other. It is assumed that such situation occurs when the position of a defect in the optical film laminate is infinitely close to the position for forming a next slit line in the optical film laminate, or when a plurality of a series of defects are distributed over a length xα. Therefore, when (x'+x0)=xα, it is preferable to provide any measures for enabling the information processing device 410 identify or discriminate a normal region Xα and a defective region Xβ by any of the following methods.

In the above (b), even if, as the result of calculation by the slitting position calculation means 415, the distance (x'+x0) from the preceding slit line position to the position for forming a next slit line becomes equal to the length xα, that region is not essentially the normal region Xα. In order to make it possible to recognize such difference, in one embodiment of the present invention, as shown by step 5 in FIG. 9, data representing a normal region and a defective region may be respectively associated with a slitting position information. For example, when the result of calculation by the slitting position calculation means 415 becomes (x'+x0)=xα (i.e., a mark exists between two adjacent slit lines), the information processing device 410 associates a defective-region-representing value Xγ=1 with either that slitting position or a preceding slitting position, as shown in FIG. 12. In other cases, that is, when x'>xα, the information processing device 410 associates a normal-region-representing value Xγ=0 with either the slitting position or a preceding slitting position. When xβ<xα, the defective-region-representing value Xγ=1 is associated with a slitting position.

In another embodiment of the present invention, if, as the result of calculation, the distance (x'+x0) to the next slitting position becomes equal to the length xα which is the length of the normal region, the slitting position calculation means 415 corrects the calculation result so that the distance to the next slitting position satisfies the relation (x'+x0'), wherein x0'>x0, as shown in step 5 in FIG. 10. By calculating xβ=(x'+x0') different from xα, this method makes it possible to allow for identifying or discriminating the region having the length (x'+x0'), i.e., the defective region Xβ, from the normal region Xα.

In yet another embodiment of the present invention, if, as the result of calculation, the length (x'+x0) to the next slitting position becomes equal to the length xα, the slitting position calculation means 415 corrects the calculation result so that the length to the position where the next slit line is to be formed becomes [(x'+x0)/m] (wherein m=2 or more, preferably 2 or 3). As shown in FIG. 14, by calculating xβ=[(x'+x0)/m] different from xα, this method makes it possible to allow for identifying or discriminating the region having the length [(x'+x0)/m], i.e., the defective region Xβ, from the normal region Xα.

Summarizing the above, as a method for creating information for identifying or discriminating the normal region Xα from the defective region Xβ, either of the following methods may be adopted:

(1) A method of creating Xγ as information for identifying or discriminating the defective region Xβ having a length (x'+x0) from the normal region Xα;

(2) A method of creating a length (x'+x0') (wherein x0'>x0) to the next slitting position, which is different from the length xα; and (3) A method of creating a length [(x'+x0)/m] (wherein m=2 or more) to the next slitting position, which is different from the length xα.

Particularly, in cases where the method (2) or (3) is carried out, (x'+x0)=xα is corrected to (x'+x0')≠xα or [(X'+x0)/m]≠xα after a correction by the slitting position calculation means 415. Thus, the next slitting position information can be used as information indicating the defective region Xβ identified or discriminated over the normal region Xα (i.e., information corresponding to Xγ in the method (1) above).

When the slitting position is determined, then in step 7, the information processing device 410, in case of the above (1), associates a length to the determined next slitting position with information Xγ and stores the slitting position in the storage device 420. In case of (2) or (3) above, the information processing device 410 stores a length to next slitting position determined in step 6 to the storage device 420.

(Formation of Slit Line)

The optical film laminate is conveyed to a slitting station A after a mark thereon is detected by the mark reading unit 120.

The slitting unit 150 of the slitting station A sequentially forms slit lines on the optical film laminate based on the slitting position information determined by the slitting position calculation means 415 and the length measurement data of the optical film laminate (i.e., the slitting unit 150 half-cuts the optical film laminate). Any well-known cutting device such as, for example, a laser cutting device or other cutting device may be used as the slitting unit 150.

(Checkup of Slitting Position)

The slitting unit 150 sequentially forms slit lines on the optical film laminate in transverse direction with respect to the feed direction of the optical film laminate at the slitting station A based on a slitting position information. However, it is difficult to improve product accuracy of liquid-crystal display element unless the sequentially formed slit lines are precisely positioned. Therefore, it is important to precisely form slit lines on the optical film laminate in the continuous manufacturing system and method for liquid-crystal display elements.

Figure 15:
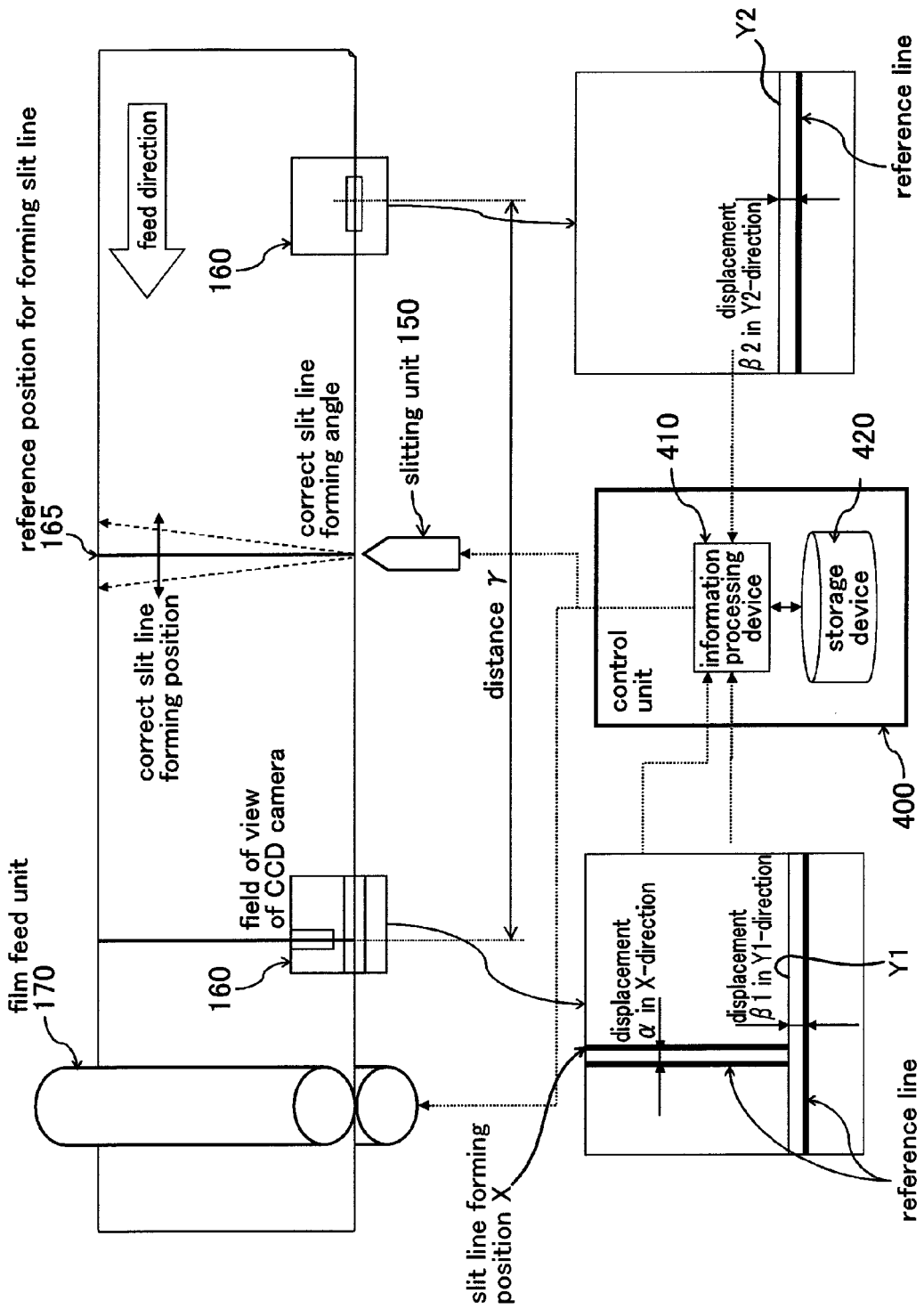
FIG. 15 is a diagram showing an operation of a slitting position checkup unit in the continuous manufacturing system of liquid-crystal display element according to one embodiment of the present invention.

FIG. 15 is a schematic diagram showing operations of the slitting position checkup unit 160. The slitting position checkup unit 160 checks a deviation between the position of the actually formed slit line in a transverse direction with respect to a feed direction of the optical film laminate and the position calculated by the slitting position calculation means 415 based on the position of the mark. Two slitting position checkup units 160 are provided, one on upstream side of and one downstream side of the slitting unit 150 as seen in the feed direction of the optical film laminate. A film feed unit 170 including a feed roller is disposed at the downstream side of the downstream slitting position checkup unit 160, whereby the feed of the optical film laminate is re-started after a very short stop during forming a slit line. On the other hand, a speed adjustment unit 140 including a dancer roller is disposed at the upstream side of the upstream slitting position checkup unit 160, whereby a feed of the optical film laminate by the film feed unit 130 is maintained even if the feeding of the optical film laminate is shortly stopped during forming a slit line.

Coincidence of the position of the actually formed slit line in a transverse direction with respect to the feed direction of the optical film laminate with the calculated slitting position, can be affirmed by determining the accurate positions in the traveling direction (X direction) and the transverse direction (Y direction) of the optical film laminate. One preferable way for checkup is to carry out the check up operations at two locations, one on the upstream side of and the other on the downstream side of the slitting position, for the deviation in X and Y directions between the actual slitting position and the edge (the side end) of the optical film laminate and the respective reference lines at those positions. For example, the slitting position checkup unit 160 may be provided with a CCD camera to take images of the actual slitting position on the optical film laminate and the edge of the optical film laminate to produce picturized images. The respective reference lines corresponding to the actual slit lines and the edge of the optical film laminate are preliminarily provided in the image-taking regions, and the slitting position and the edge position can be determined in terms of differences in contrasts in the taken images. Then, a calculation is made to determine the distances (deviations) between the predetermined reference lines and the respective positions of the actually formed slit line and the edge of the optical film laminate, and the position and the angular position of the slitting unit 150 is corrected, based on the calculated distance (deviation).

Specifically, the inspection for determining the deviation between the position of the actually formed slit line of the optical film laminate and the position calculated by the slitting position calculation means 415 is carried out for example in accordance with the following procedures.

(1) Images of the position (X) of the actual slit line and two positions (Y1, Y2) of the edge of the optical film laminate are taken by the slitting position checkup unit 160 including a CCD camera, and the position of the actual slit line (X) and the positions of the edges (Y1, Y2) are determined in terms of the differences in contrast.

(2) There is a slitting reference position 165 extending in Y direction at a position between a reference line extending in Y direction at an upstream position as seen in X direction in the imaging area of one of the slitting position checkup unit 160, and another reference line extending in Y direction at a downstream position as seen in X direction in the imaging area of the other of the slitting position checkup unit 160, and data γ representing the distance between the upstream and downstream reference lines is preliminarily stored in the storage device 420. Furthermore, there is a downstream reference line extending in the X direction in the image-taking region of the slitting position checkup unit 160.

(3) A correction value α for correcting the position of the slit line X and a correction value δ for angularly correcting the position of the slit line are calculated based on the measured positions of the actually formed slit line (X) and the edge (Y1, Y2) and the reference lines. The correction value α corresponds to the measured deviation α, or the deviation α between the actual slit-line position (X) and the downstream side reference line extending in the Y direction. The correction value δ can be calculated according to the following equation, based on the deviations in Y direction of the edge of the continuous optical film laminate 15 at two positions, or the deviations (β1, β2) of the edge of the continuous optical film laminate with respect to respective ones of the upstream and downstream reference lines extending in the X direction, and the distance data γ between the two reference lines.

$$\delta = \cos^{-1}\left\{\frac{\gamma}{\sqrt{\gamma^2 + (\beta_1 - \beta_2)^2}}\right\} \quad \text{[Equation 1]}$$

(4) The storage device 420 is used to store correction values (α, δ) for applying an instruction to the slitting unit 150 to perform an angular position correction by a value δ and a positional correction by value α in the X direction based on the measured and calculated data so as to make the slit line conform to the reference line of the position where the slit line is to be formed in the Y direction.

(5) The slitting unit 150 corrects, when forming a next slit line, position in the feed direction and an angular position in a transverse direction with respect to the feed direction, based on the stored correction values (α, δ) so that the slit line conforms to the reference line.

(6) The slitting unit 150 operates to form a next slit line in the optical film laminate.

(Removal of Defective Polarizing Sheet)

The optical film laminate is conveyed to the removal station C after slit lines being formed by the slitting unit 150. Normal polarizing sheets Xα and defective polarizing sheets Xβ of the polarizing composite film 11 are in conditions releasably laminated on the carrier film 14 by being separated from each other by the respective slit lines on the carrier film 14 of the optical film laminate conveyed to the removal station C. There is provided a defective polarizing sheet removal unit 190 in the removal station C and functions to identify or discriminate the defective polarizing sheets Xβ included in the optical film laminate, and peels and removes them from the carrier film 14. The defective polarizing sheet removal unit 190 identifies or discriminates only the defective polarizing sheets Xβ over the normal polarizing sheets based on identification information of defective polarizing sheet as shown in FIG. 9 and FIG. 12, or, may identify or discriminate the defective polarizing sheets Xβ based on lengths of the normal polarizing sheet Xα and the defective polarizing sheets Xβ as shown in FIG. 10, FIG. 11, FIG. 13, and FIG. 14. FIGS. 16 (1) and (2) show the defective polarizing sheet removal unit 190 which operates to identify or discriminate a defective polarizing sheet Xβ.

The defective polarizing sheet removal unit 190 in FIG. 16 (1) comprises a dummy film drive mechanism 191 for feeding a dummy film to a position where the dummy film is attached to the defective polarizing sheet Xβ. The defective polarizing sheet Xβ releasably laminated to the carrier film 14 is then removed from the carrier film 14 as the dummy film is advanced. There is a moving unit 192 adapted to be activated when the defective polarizing sheet Xβ reaches a removal initiation point for the defective polarizing sheet in a feed path of the optical film laminate. The moving unit 192 functions to move the optical film laminate to a position where the defective polarizing sheet Xβ can be brought into contact with the dummy film transported by the dummy film drive mechanism 191.

The defective polarizing sheet removal unit 190 in FIG. 16 (2) is configured to be operated in an inter-related manner with the lamination unit 200 including a pair of lamination rollers provided at the lamination station B, and comprises, as in the unit 190 shown in FIG. 16(1), a dummy film drive mechanism 191 having a function of capturing the defective polarizing sheet Xβ releasably laminated to the carrier film 14 by a dummy film, and a movable roller 192 defining a dummy film feed path of the dummy film drive mechanism 191. The removal unit in FIG. 16 (2) is different from the removal unit in FIG. 16 (1) in that, in the removal unit in FIG. 16 (2), the movable roller 192 defining the dummy film feed path disposed adjacent to the pair of lamination rollers of the lamination unit 200 at the lamination station B is arranged in a inter-related manner with the lamination rollers in the lamination unit 200. More specifically, when the defective polarizing sheet Xβ reaches an end position (i.e., the removal initiation position) of the feed path of the optical film laminate, the control unit 400 instructs the pair of lamination rollers to move apart from each other and the movable roller 192 defining the dummy film feed path to move to the gap between the lamination rollers which are in spaced-apart relation to replace one of the rollers of the pair of the lamination rollers by the movable roller 192, so that the movable roller 192 and the other laminating roller are operated in an inter-related manner. In this instance, the carrier film 14 is taken up by the carrier film take up drive mechanism 210, and the defective polarizing sheet Xβ is peeled from the carrier film 14 and the peeled defective polarizing sheet Xβ is attached to the dummy film in the dummy film feed path by means of the movable roller 192 operated in an inter-related manner with the other roller of the pair of the lamination rollers, and is removed from the carrier film 14.

(Conveyance of Liquid-Crystal Panel and Lamination with Normal Polarizing Sheet)

Figure 17:
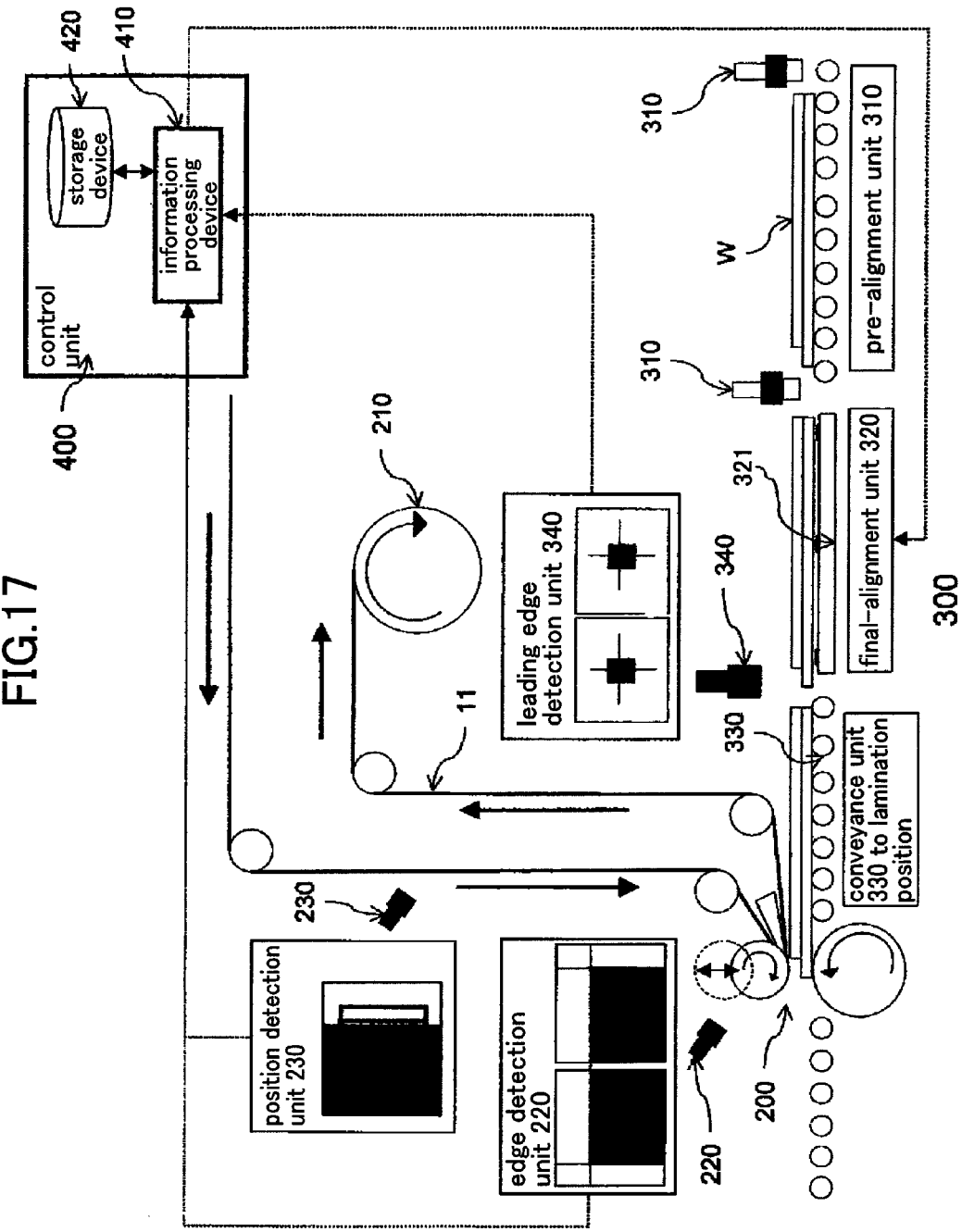
FIG. 17 is a schematic diagram showing conveying liquid-crystal panel to a lamination position in a posture-controlled state by controlling a pre-alignment unit, a final-alignment unit, a liquid-crystal panel conveyance unit for conveying the panels to the lamination position and a panel-edge detection unit in the liquid-crystal panel conveyance unit, based on the information on the sheets determined by the determination unit in the liquid-crystal display element continuous manufacturing system according to one embodiment of the present invention.
Figure 18:
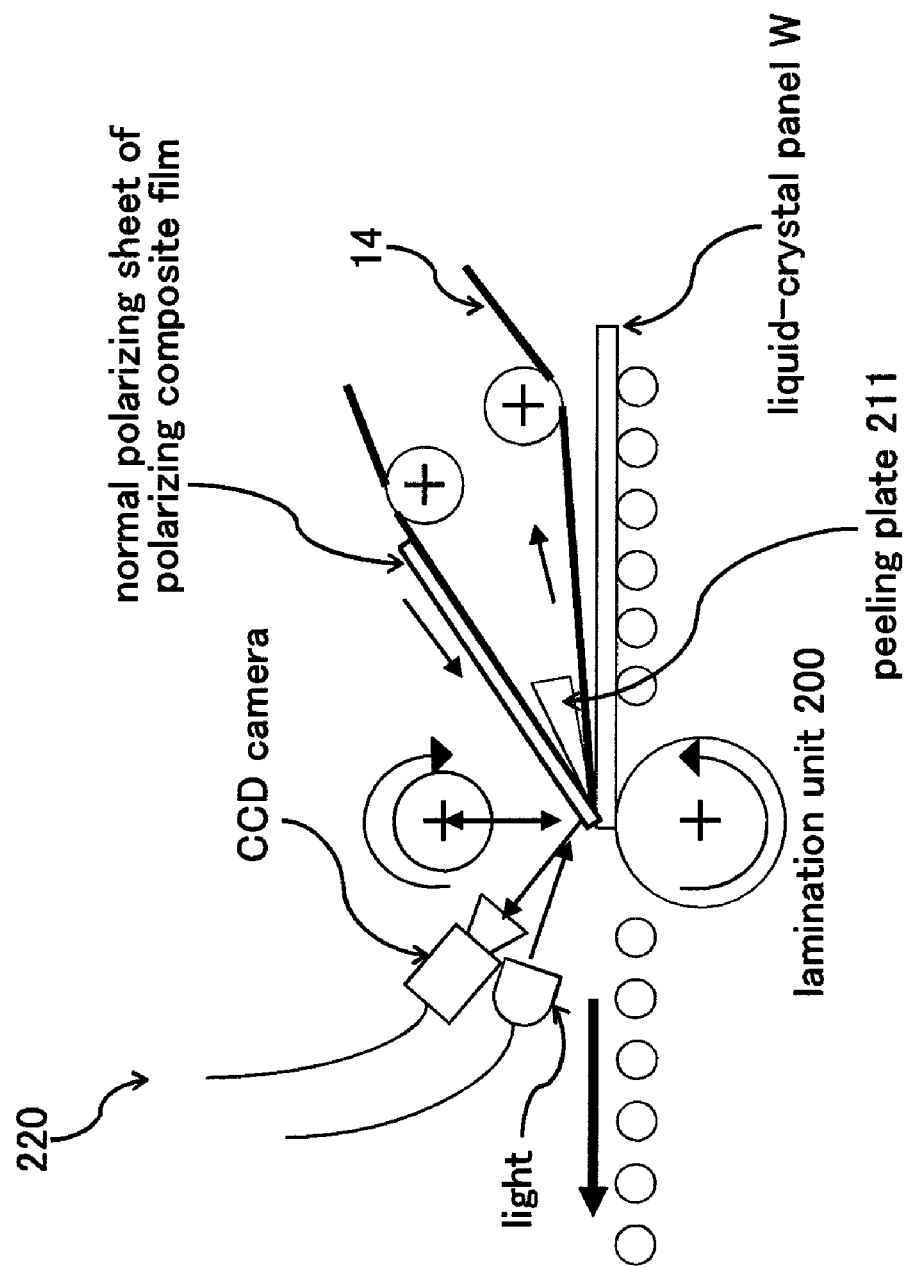
FIG. 18 illustrates a lamination unit for laminating a normal polarizing sheet to a respective one of a liquid-crystal panel, in the continuous manufacturing system of liquid-crystal display element according to one embodiment of the present invention.

The optical film laminate, having defective polarizing sheets Xβ removed at the removal station C as shown in FIG. 16 (1) and only normal polarizing sheets Xα existing on the carrier film 14, is then conveyed to the lamination station B. In another embodiment adopting the removal unit shown in FIG. 16 (2), an optical film laminate having normal polarizing sheets Xα and defective polarizing sheets Xβ on the carrier film 14 is conveyed to the lamination station B. Although lamination of liquid-crystal panel and normal polarizing sheets Xα is described herein with respect to the former embodiment, the latter embodiment is the same as in the former embodiment, except that defective polarizing sheets Xβ are removed at the lamination station B. FIG. 17 is a schematic diagram showing transportation of liquid-crystal panel to the lamination position with the position or orientation controlled by means of a pre-alignment unit 310, a final-alignment unit 320, a conveyance unit 330 for conveying the panels to the lamination position, and a panel-edge detection unit 340 in the liquid-crystal panel conveyance unit. FIG. 18 illustrates a lamination unit for laminating normal polarizing sheets to respective ones of liquid-crystal panels W, comprising an edge detection unit 220 for detecting a leading edge of normal polarizing sheet Xα and a peeling plate 211 for bending the carrier film 14 in an acute angle so that the normal polarizing sheet Xα is peeled apart from the carrier film 14.

The liquid-crystal panels W are taken out one-by-one from a magazine containing a large number of liquid-crystal panels, by means of a liquid-crystal-panel supply unit, and conveyed through cleaning/polishing stage to the lamination unit 200 at the lamination station by a liquid-crystal panel conveyance unit 300, by being adjusted to equal intervals and a constant transportation speed. The liquid-crystal panel conveyance unit 300 comprises a liquid-crystal posture or position control device including, as shown in FIG. 17, the pre-alignment unit 310, the final-alignment unit 320, the conveyance unit 330 for conveying the panels to the lamination position, and the panel-edge detection unit 340. The conveyance unit 300 aligns the orientation of the liquid-crystal panel W, when the normal polarizing sheet Xα is transported to the lamination station B, in synchronization with the transportation of the normal polarizing sheet Xα.

Supplying speed of the normal polarizing sheets Xα on the carrier film 14 to the lamination unit 200 at the lamination station B is preferably adjusted to a constant speed. As shown in FIG. 17 or FIG. 18, the carrier film 14 is bent in an acute angle by the peeling plate 211 at the lamination station B to peel the normal polarizing sheet Xα. Bending the carrier film 14 in an acute angle allows gradually exposing an adhesive layer of the normal polarizing sheet Xα. As a result, the leading edge of the normal polarizing sheet Xα is slightly exposed to facilitate an alignment with the leading edge of the liquid-crystal panel W.

The leading edge of the normal polarizing sheet Xα is moved to the nip defined between the pair of lamination rollers of the lamination unit 200 when the rollers are in the vertically spaced apart relation to each other. Although the normal polarizing sheet Xα is fed in a state laminated on the carrier film 14, it is seldom that the normal polarizing sheet Xα is accurately fed so that the angle θ between the feed direction and the lengthwise direction of the carrier film 14 becomes zero. Therefore, deviations of the normal polarizing sheet Xα in the feed direction and the transverse direction are measured, for example, by taking images of the sheet using the CCD camera of the sheet orientation detection unit 230 and subjecting the taken images to an image processing, whereby the measured deviations are calculated in terms of a distance in lengthwise direction x, a distance in a direction perpendicular to the lengthwise direction y and an angle between the feed direction and the lengthwise direction θ.

On the other hand, liquid-crystal panels W are sequentially supplied one-by-one at a constant interval and speed from a supplying unit, and the posture or orientation of the panel is controlled by a liquid-crystal panel conveyance unit 300 as shown in FIG. 17. The posture control is now explained with reference to FIG. 17.

Figure 2:
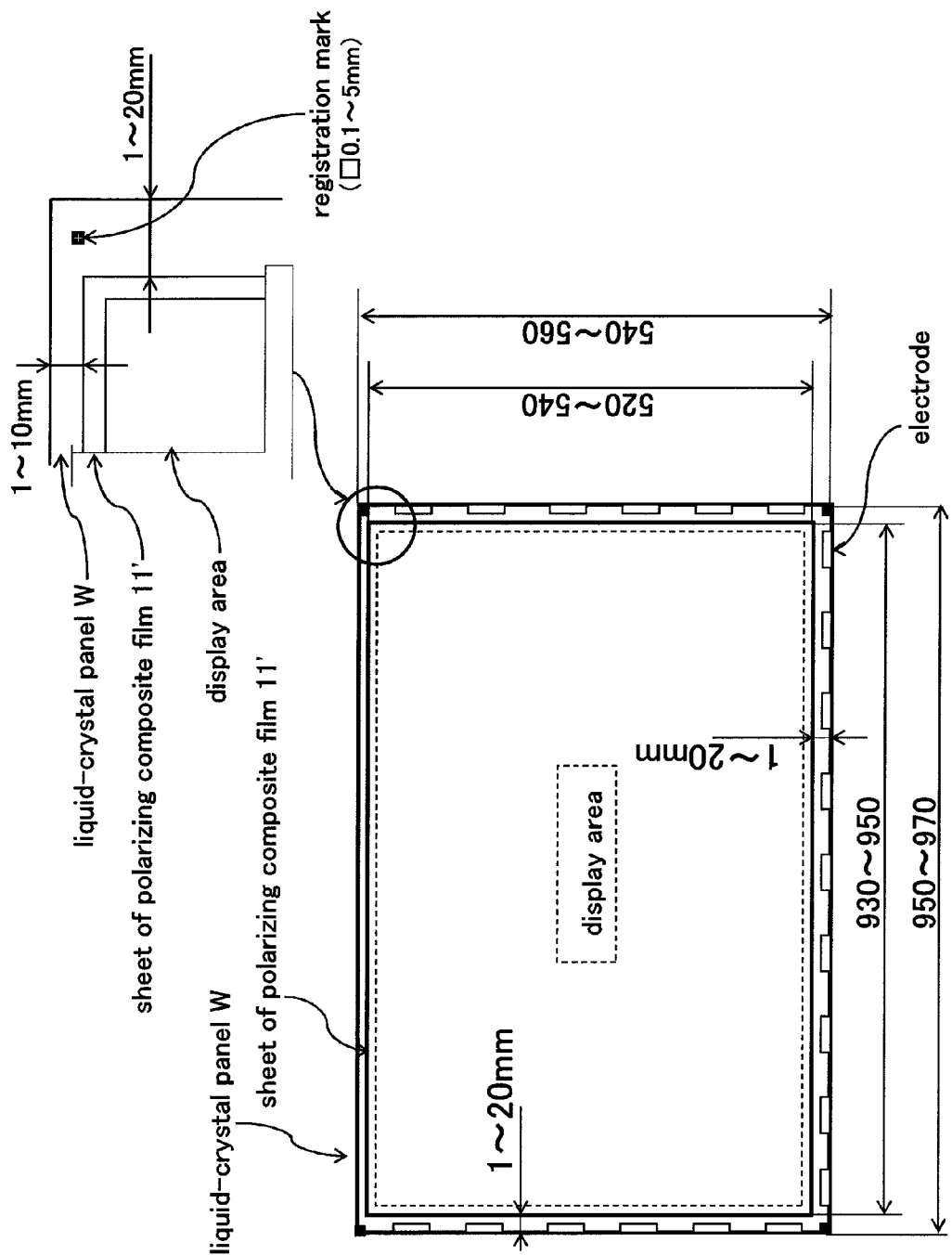
FIG. 2 illustrates a typical example of a liquid-crystal display element for a widescreen television having a diagonal screen size of 42 inches.

The liquid-crystal panels W are roughly positioned by the pre-alignment unit 310, so that they are aligned in lengthwise direction and a direction perpendicular to the lengthwise direction respectively with respect to the feed direction and the direction transverse to the feed direction in the conveyance path. The positioned liquid-crystal panel W is conveyed to and placed on the final-alignment unit 320 which includes a turnable alignment table 321. The leading edge of the liquid-crystal panel W placed on the alignment table 321 is detected by the panel-edge detection unit 340. The position of the detected leading edge of the liquid-crystal panel W is checked for match with the reference lamination position stored in the storage device 420, specifically, the calculation data in terms of x, y and θ to represent the orientation of the normal polarizing sheet Xα to be laminated to the liquid-crystal panel W. For example, the deviation between the leading edge of the liquid-crystal panel W and the reference lamination position is measured using an alignment mark of the liquid-crystal panel W illustrated in FIG. 2 to calculate the angular displacement θ, and the alignment table 321 having the liquid-crystal panel W placed thereon is turned by the angular displacement θ. Then, the alignment table 321 is connected to the conveyance unit 330 directed toward the lamination unit 200 at the lamination station B. The liquid-crystal panel W is conveyed to the lamination unit 200 by the conveyance unit 330, while keeping the same orientation. The leading edge of the liquid-crystal panel W is registered with and laid on the leading edge of the normal polarizing sheet Xα. In the final stage, the normal polarizing sheet Xα and the liquid-crystal panel W which are in aligned relation with each other and are held between the pair of lamination rollers are pressed thereby to obtain a finished liquid-crystal display element.

In the method and the system according the present invention, the normal polarizing sheet Xα is fed to the lamination unit 200 for lamination with the liquid-crystal panel W together with the carrier film 14 while the optical film laminate is being advanced under tension, so that there is least possibility that the periphery of the normal polarizing sheet Xα is bent or sagged and that the periphery of the normal polarizing sheet Xα is bowed or warped. This makes it easy to have the orientation of the liquid-crystal panel W aligned with the normal polarizing sheet Xα and makes the manufacturing speed of the liquid-crystal display element increased and the product accuracy improved. Such method and system cannot be adopted in the manufacturing process utilizing the individualized sheets, wherein the process is carried out by peeling a separator from each of the individualized sheets to expose the adhesive layer, and feeding under a vacuum suction each of the sheets to a lamination position, adjusting the position of the sheet with respect to the liquid-crystal panel W and laminating the sheet to the liquid-crystal panel W.

EXAMPLES

4. Examples

Examples of detection ratio of marks provided on the optical film laminate will now be described in the followings.
(Optical Film Laminate)
The optical film laminates used in the examples are those manufactured under the trade-name of VEG1724DU by Nitto Denko Corporation, and comprising a polarizing composite film including a polarizer, a transparent protective film laminated on each of the opposite surfaces of the polarizer consisting of a polyvinyl alcohol film which was dyed with iodine, an acrylic adhesive layer was provided on one of the opposite surfaces of the polarizing composite film, and a carrier film (a separator), being made from a polyethylene terephthalate film and having a silicon releasing agent was coated to the adhesive layer, was laminated thereto.
(Provision of Mark)
The above optical film laminate was fed out from a roll of the optical film laminate using a nip drive roll at a conveyance speed of 10 m/min or 20 m/min and passed through support rolls arranged in 200 mm interval. In this instance, the optical film laminate was conveyed so that the carrier film of the laminate is faced to the support rolls. A mark was applied by a marker on one of the opposite surfaces of such conveyed optical film laminate which the adhesive layer is not formed, i.e., on the protective film. The marker was arranged in a holder at an end portion of an actuator driven by a servo motor and was arranged so that it could vertically move by an operation of the actuator. The tip of the marker was adjusted so that the marker was positioned at −5 mm from the surface of the protective film when a mark was to be applied (i.e., a difference between a level of the surface of the protective film as depressed by the tip of the marker touching the protective film and the level of the protection film passing on the periphery of the support roll was −5 mm). An angle formed by a central axis of the marker and the surface of the protective film was adjusted to be 60 degrees. Marks are provided on the optical film laminate by varying a ratio (an aspect ratio) of their longitudinal length (a length in a direction parallel to a feed direction of the optical film laminate) and their transverse length (a length in a direction transverse to the feed direction). Longitudinal lengths, transverse lengths and aspect ratios of provided marks are shown in FIG. 20.

The markers used in the examples and in comparative examples were of the following three types, and the aspect ratio and printing speed of marks provided with each type of markers were shown in FIG. 20.

A: "Lumocolor (black)" from Staedtler Mars GmbH & Co. KG.

B: "Junshin (black)" from Shachihata Inc.

C: "V Supercolor (black)" from Pilot Corporation

The separator was peeled from the optical film laminate having the marks applied thereto by the markers A to C above, and was laminated to a slide glass of a size of 50 mm×100 mm from Matsunami Glass Industry Ltd. Surface shapes of the marks were measured using an optical surface roughness gauge WYKO NT9800 from Veeco Instruments Inc.

Measuring conditions are as follows.
Reference line: set on a surface of the optical film laminate on which marks are provided
Back scan (upper limit to a measuring height from the reference line): 30 μm
Scan length (a distance from the maximum height to the lower limit): 40 μm
Modulation threshold (photoreception sensitivity): 0.1%
Stitching (range of measurement): X=25 mm, Y=8 mm
From obtained data of the surface shapes, an area of a section passing the midpoint of a mark in the longitudinal direction and being perpendicular to the longitudinal direction was determined, and a value of the cross-sectional area divided by a bottom-length of the cross-section of the mark was set to be a thickness at a center of the mark. Calculated thickness of each of the marks was shown in FIG. 20.
(Measurement of Optical Density)
The optical film laminate provided with marks by the markers A to C above was laminated to a slide glass of a size of 50 mm×100 mm from Matsunami Glass Industry Ltd. by means of a masking tape No. 7253 from Nitto Denko Corporation. An absorption spectrum in a micro region of a mark was measured with a micro-spectrophotometer LVmicro from Lambda Vision Inc. and a peak value of absorbency was determined to be an optical density.

Measuring conditions are as follows.
Light source: a halogen deuterium light source
Pin-hole size: φ 100 μm
Sensor: a multi-detector
Measuring mode: transmissivity measuring mode
Optical density of each of the marks is shown in FIG. 20.
(Measurement of Detection Ratio)

Figure 19:
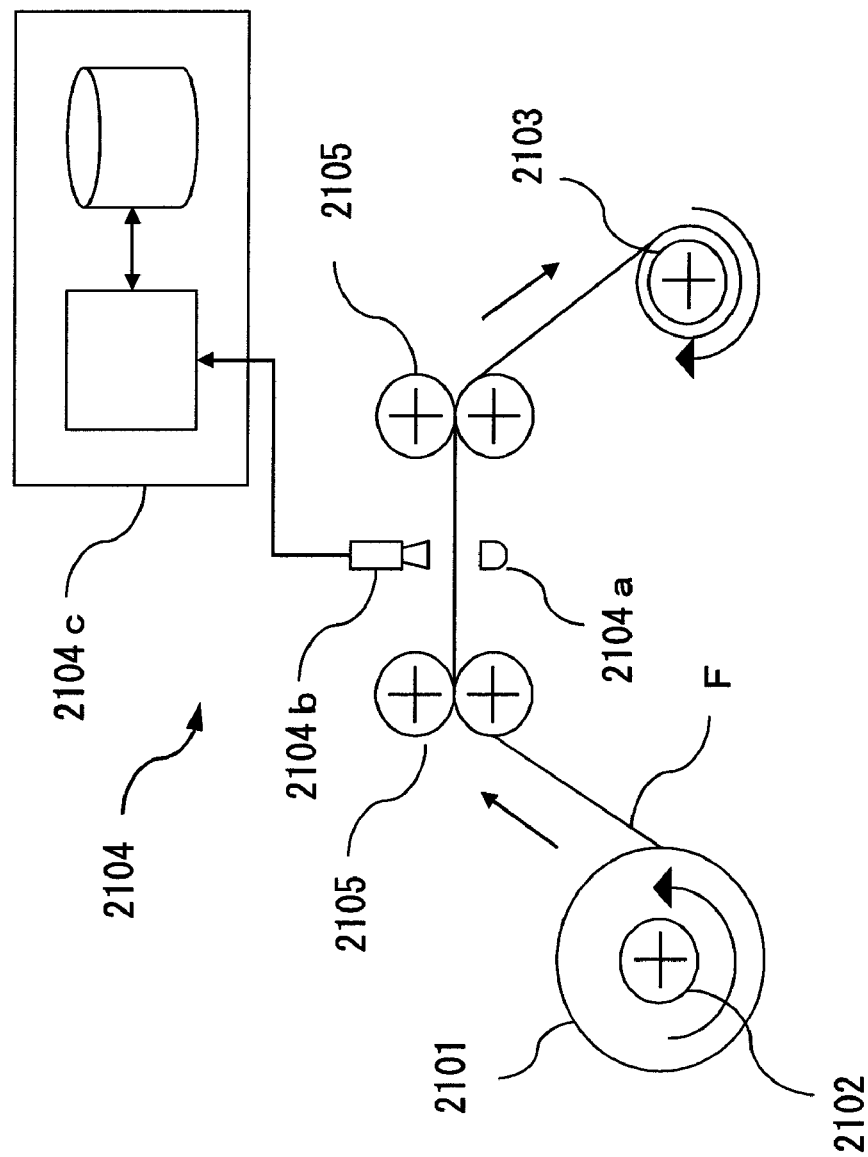
FIG. 19 is a diagram showing a mark detection test unit used for measuring detection ratio in terms of detection efficiency of a mark provided on an optical film laminate.

FIG. 19 is a diagram showing a mark detection test unit used for measuring detection ratio of a mark provided on the optical film laminate. The mark detection test unit comprises a roller rack 2102 for mounting the roll of the optical film laminate F with marks, a roller rack 2103 for winding fed out optical film laminate F, a mark detection unit 2104 for detecting provided marks, and a plurality of rollers 2105 for supporting the optical film laminate F. The mark detection unit 2104 includes FL48/800W85-DF from Raytronics Corporation as a light source 2104a and CV-2000 from Keyence Corporation as a controller 2104c.

A mark detection test was performed as follows.

The optical film laminate described above in a size of 400 mm in width and 200 m in length was prepared, and marks were provided with the above markers A to C on a surface of the exposed protective film (i.e., the surface without the adhesive layer). For each of the marks shown in FIG. 20, the number of marks was 100. The optical film laminate F was wound as a roll 2101 and mounted on the mark detection test unit. The roll 2101 with marks was mounted between the roller racks 2102 and 2103 under tension, and the optical film laminate F was wound from the roller rack 2102 to the roller rack 2103 at a conveyance speed of 5.0 m/min. The marks provided on the optical film laminate F were detected by the mark detection unit 2104. Transmitted light radiated from the light source 2104a was detected by a camera 2104b, and information on luminous intensity of light incident to the camera was converted to 256 levels of gray by the controller 2104c. The controller 2104c compared a difference of level of gray occurring from difference of luminous intensity of light transmitting through the marks and the optical film laminate without the marks, with a predefined threshold value, and if the difference was greater than the threshold value, it was determined that there was a mark provided. In the example, threshold value was 150.

Detection ratio for different shape of marks provided to the optical film laminate is shown in FIG. 20. The number of unacceptable markings occurring in providing marks is also shown in FIG. 20. The number of such unacceptable markings was measured as follows. Each of the marks shown in FIG. 20 was provided at every 2 m on the optical film laminate (400 mm in width and 1100 m in length), and the optical film laminate with marks was wound to a roll under a tension of 100N. The roll was stored for one month at a temperature of 23° C. and a relative humidity of 40%, then, was cut in a fixed length of 700 mm to obtain 1000 samples without marks to visually check a number of missed markings.

(1) The comparative examples 1 and 2 are results where an aspect ratio of mark was varied in the examples 1 to 4. The shape of marks in the examples 1 to 4 was rectangle whose longitudinal length was greater than transverse length, while the shape of marks in the comparative examples 1 and 2 were substantially square. It is found that a detection ratio for a square mark was less than that for a rectangular mark.

(2) The comparative examples 3 and 4 are results where an optical density of mark was varied in the examples 1 to 4. It is found that a detection ratio for a mark with low optical density was decreased even if the shape of the mark was rectangle.

(3) The comparative examples 5 to 10 are results where markers were varied in the examples 1 to 4. The marks of the comparative examples 5 and 6 were rectangle in shape as those in the examples 1 to 4 and had high optical density. Thus, the detection ratio was 100%. However, the number of missed marking was very large since a thickness of the mark was large, and if these marks were used, it will significantly reduce a production yield.

(4) The marks of the comparative examples 7 to 10 were rectangle in shape as those in the examples 1 to 4 and had low optical density. It is found that a detection ratio for those marks was low.

From the results shown in FIG. 20, by selecting a shape of mark and using an appropriate marking method providing optical intensity higher than an appropriate value, it is enabled to significantly enhance product accuracy and manufacturing speed, and to drastically improve manufacturing yield, in the continuous manufacturing of liquid-crystal display elements.

Although the present invention has been described in connection with preferred embodiments, it will be understood that various changes and modifications will be made by those skilled in the art without departing from the spirit and scope of the invention, defined in the following claims, and legal equivalents of the following claims may be substituted for elements thereof. Accordingly, the present invention is not limited to the specific embodiments disclosed as the best mode for carrying out the invention, but intended to cover all embodiments included within the scope thereof.

The invention claimed is:

1. A method for continuously manufacturing liquid-crystal display elements by laminating sheets of polarizing composite film each having a predefined length to respective ones of a plurality of liquid-crystal panels, said sheet of polarizing composite film being formed from a continuous web of an optical film laminate having a width corresponding to a long or short side of the liquid-crystal panel, the continuous web of the optical film laminate comprising a polarizing composite film with an adhesive layer and a carrier film releasably laminated to the adhesive layer, the method comprising steps of:

continuously feeding a continuous web of an optical film laminate to a slitting position;

measuring a feed length of the optical film laminate and calculating a length measurement data based on the feed length;

detecting a mark at a position before a position where the mark reaches the slitting position while feeding the optical film laminate, the mark being provided in the optical film laminate for indicating position of defect in the polarizing composite film which is detected in a preliminary inspection;

determining positions for forming slit lines on the optical film laminate in a perpendicular direction with respect to the lengthwise direction of the optical film laminate based on the detected mark and the length measurement data, sequentially forming the slit lines at a side opposite to the carrier film to a depth reaching a surface of the carrier film adjacent to the adhesive layer at the slitting position based on the determined positions for forming the slit lines, determining the polarizing composite film sheet defined between two longitudinally adjacent ones of the slit lines is a defective polarizing sheet with the mark or a normal polarizing sheet without the mark, peeling a sheet determined to be the normal polarizing sheet from the carrier film, and feeding liquid-crystal panel to a lamination position so as to be aligned with the normal polarizing sheet and laminating the normal polarizing sheet to said liquid-crystal panel.

2. The method as defined in claim 1, wherein, when a length of the defective polarizing sheet in the feed direction is the same as or longer than the length of the liquid-crystal panel, a plurality of slit lines are formed on the defective polarizing sheet in perpendicular direction with respect to the feed direction so that the length of the defective polarizing sheet becomes shorter than the length of the liquid-crystal panel.

3. The method as defined in claim 1, wherein the position of the mark provided on the optical film laminate in the feed direction is substantially the same as the position of the defect in the feed direction.

4. The method as defined in claim 1, wherein the step of detecting a mark comprises a step of identifying an existence of the mark by determining a difference of luminous intensity between light reflected at or transmitted through the mark and received by a light detecting unit, and light reflected at or transmitted through regions other than the mark and received by the light detecting unit.

5. The method as defined in claim 4, wherein the mark has an axisymmetrical shape having two perpendicularly crossing axisymmetrical axes, wherein lengths of said two perpendicularly crossing axisymmetrical axes of the mark are different from each other, and an angle of a longer axis of the axisymmetrical axes of the mark with respect to the feed direction of the optical film laminate is smaller than 45 degrees.

6. The method as defined in claim 1, further comprising a step of removing a sheet determined to be a defective polarizing sheet so as not to laminate the sheet to liquid-crystal panel, said defective polarizing sheet being among the sheets of the polarizing composite film defined between respective two adjacent ones of slit lines sequentially formed on the optical film laminate.

7. The method as defined in claim 6, wherein the step of removing a sheet determined to be a defective polarizing sheet so as not to laminate the sheet to liquid-crystal panel comprises removing the defective polarizing sheet from a feed path of the optical film laminate by moving a part of the optical film laminate including the defective polarizing sheet to a dummy film feed path for feeding a dummy film when the defective polarizing sheet defined on the optical film laminate reaches a removal position to capture the defective polarizing sheet by the dummy film.

8. The method as defined in claim 6, wherein the step of removing a sheet determined to be a defective polarizing sheet so as not to laminate the sheet to liquid-crystal panel comprises removing the defective polarizing sheet from the feed path of the optical film laminate by feeding a dummy film to the lamination position when the defective polarizing sheet defined on the optical film laminate reaches the lamination position to laminate the defective polarizing sheet to the dummy film.

9. A system for continuously manufacturing liquid-crystal display element by laminating sheets of polarizing composite film each having a predefined length, to respective ones of a plurality of liquid-crystal panels, said sheet of polarizing composite film being formed from a continuous web of an optical film laminate having a width corresponding to a long or short side of the liquid-crystal panel, the continuous web of the optical film laminate comprising a polarizing composite film with an adhesive layer and a carrier film releasably laminated to the adhesive layer, the system comprising:

an optical film laminate feed unit for continuously feeding a continuous web of an optical film laminate to a slitting position, a measuring unit for measuring a feed length of the optical film laminate and calculating a length measurement data based on the feed length, a mark detecting unit for detecting a mark at a position before a position where the mark reaches the slitting position while feeding the optical film laminate, the mark being provided on the optical film laminate for indicating position of defect in the polarizing composite film which is detected in a preliminary inspection;

a slitting position calculation means for determining positions for forming slit lines on the optical film laminate in a perpendicular direction with respect to the lengthwise direction of the optical film laminate based on the mark detected and the length measurement data;

a slit forming unit for sequentially forming the slit lines at a side opposite to the carrier film to a depth reaching a surface of the carrier film adjacent to the adhesive layer based on the positions for forming the slit lines;

a control unit for determining whether the polarizing composite film sheet defined between two longitudinally adjacent ones of the slit lines is a defective polarizing sheet with the mark or a normal polarizing sheet without the mark;

a peeling unit for peeling a sheet determined to be the normal polarizing sheet from the carrier film; and a lamination unit for feeding liquid-crystal panel to a lamination position so as to be aligned with the normal polarizing sheet being and laminating the normal polarizing sheet to said liquid-crystal panel.

10. The system as defined in claim 9, wherein, when a length of the defective polarizing sheet in the feed direction is the same as or longer than the length of the liquid-crystal panel, a plurality of slit lines are formed on the defective polarizing sheet in perpendicular direction with respect to the feed direction so that the length of the defective polarizing sheet becomes shorter than the length of the liquid-crystal panel.

11. The system as defined in claim 9, wherein position of the mark provided on the optical film laminate in the feed direction is substantially the same as the position of the defect in the feed direction.

12. The system as defined in claim 9, wherein the mark detecting unit comprises a light source, a light detecting unit arranged on the same or opposite side of the optical film laminate with respect to the light source, and a control unit for receiving information from the light detecting unit, wherein the control unit identifies an existence of the mark by determining a difference of luminous intensity between light reflected at or transmitted through the mark and received by a light detecting unit, and light reflected at or transmitted through regions other than the mark and received by the light detecting unit.

13. The system as defined in claim 12, wherein the mark has an axisymmetrical shape having two perpendicularly crossing axisymmetrical axes, wherein lengths of said two perpendicularly crossing axisymmetrical axes of the mark are different each other, and an angle of a longer axis of the axisymmetrical axes of the mark with respect to the feed direction of the optical film laminate is smaller than 45 degrees.

* * * * *